(12) United States Patent
Komukai et al.

(10) Patent No.: US 11,958,948 B2
(45) Date of Patent: Apr. 16, 2024

(54) ROTARY MEMBER AND METHOD FOR MANUFACTURING SAME

(71) Applicant: NITTA CORPORATION, Osaka (JP)

(72) Inventors: Takuji Komukai, Osaka (JP); Maki Onizuka, Osaka (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 18/039,357

(22) PCT Filed: Nov. 30, 2021

(86) PCT No.: PCT/JP2021/043891
§ 371 (c)(1),
(2) Date: Jul. 6, 2023

(87) PCT Pub. No.: WO2022/114225
PCT Pub. Date: Jun. 2, 2022

(65) Prior Publication Data
US 2023/0416474 A1   Dec. 28, 2023

(30) Foreign Application Priority Data

Nov. 30, 2020   (JP) .................................. 2020-199243

(51) Int. Cl.
*H02K 1/27* (2022.01)
*C08J 5/00* (2006.01)
(Continued)

(52) U.S. Cl.
CPC .............. *C08J 5/042* (2013.01); *C08J 5/005* (2013.01); *H02K 1/2706* (2013.01); *H02K 15/03* (2013.01); *C08J 2300/00* (2013.01)

(58) Field of Classification Search
CPC ........ C08J 5/042; C08J 5/005; C08J 2300/00; H02K 1/2706; H02K 15/03; H02K 1/278;
(Continued)

(56) References Cited

U.S. PATENT DOCUMENTS

2016/0083899 A1\* 3/2016 Onizuka .................. C08J 5/005
423/447.2

FOREIGN PATENT DOCUMENTS

JP       2003319581 A   11/2003
JP       2007238753 A    9/2007
(Continued)

OTHER PUBLICATIONS

Notice of Reasons for Refusal issued in corresponding Japanese Application No. 2022-565511 dated Mar. 28, 2023 (10 pages).
(Continued)

*Primary Examiner* — Thomas Truong
(74) *Attorney, Agent, or Firm* — Osha Bergman Watanabe & Burton LLP

(57) ABSTRACT

A rotary member rotatable along a circumferential direction includes: carbon fibers wound in the circumferential direction; a matrix resin in which the carbon fibers are embedded; and a structure which includes a plurality of carbon nanotubes having a bent shape with a bent portion, forms a network structure including a contact portion where the carbon nanotubes are in direct contact with each other, and is provided on surfaces of the carbon fibers.

9 Claims, 19 Drawing Sheets

(51) Int. Cl.
*C08J 5/04* (2006.01)
*H02K 1/2706* (2022.01)
*H02K 15/03* (2006.01)

(58) Field of Classification Search
CPC ...... H02K 15/14; H02K 5/02; H02K 2213/03; H02K 1/28; H02K 1/04; H02K 15/12
See application file for complete search history.

(56) References Cited

FOREIGN PATENT DOCUMENTS

| | | | |
|---|---|---|---|
| JP | 2009-084080 | A | 4/2009 |
| JP | 2018043521 | A | 3/2018 |
| WO | 2018043046 | A1 | 3/2018 |
| WO | 2018151009 | A1 | 8/2018 |
| WO | 2020188006 | A1 | 9/2020 |

OTHER PUBLICATIONS

Decision to Grant a Patent issued in corresponding Japanese Application No. 2022-565511 dated Aug. 1, 2023 (5 pages).
Written Opinion issued in corresponding International Application No. PCT/JP2021/043891, dated Feb. 15, 2022 (4 pages).
International Search Report issued in corresponding International Application No. PCT/JP2021/043891, dated Feb. 15, 2022, with translation (5 pages).

\* cited by examiner

Rm=0.8%

Rm=1.1%

Rm=1.5%

ROTARY MEMBER AND METHOD FOR MANUFACTURING SAME

TECHNICAL FIELD

The present invention relates to a rotary member and a method for manufacturing the rotary member.

BACKGROUND ART

As a rotary member that rotates at a high speed, for example, a rotary member that is fitted around a rotor of a surface magnet type electric motor is known (for example, refer to PTL 1). A plurality of permanent magnets are embedded in an outer circumferential surface of the rotor of the surface magnet type electric motor, and the rotor is press-fitted into a hollow inside of the rotary member in order to prevent the permanent magnets from being peeled off and scattered from the rotor due to a centrifugal force. Since a force from the permanent magnets acts on the rotary member toward an outer side in a diameter direction, high tensile strength is required in a circumferential direction of the rotary member. In addition, a centrifugal force also acts on the mass of the rotary member. Therefore, as the rotary member, an article formed from a carbon fiber-reinforced plastic in which carbon fibers are set as a reinforcement fiber is also known. In addition, as a rotary member that rotates at a high speed, a tubular rotary body of a centrifugal separator used for centrifugal separation, and the like are known.

CITATION LIST

Patent Literature

PTL 1: JP-A-2003-319581

SUMMARY OF INVENTION

Technical Problem

The rotary member formed from the carbon fiber-reinforced plastic as described above is light in weight and has high tensile strength, but the rotary member is required to have higher tensile strength in correspondence with higher speed rotation of a surface magnet type electric motor or a centrifugal separator.

An object of the invention is to provide a rotary member that is light in weight and has higher tensile strength, and a method for manufacturing the rotary member.

Solution to Problem

According to an aspect of the invention, there is provided a rotary member rotatable along a circumferential direction. The rotary member includes: carbon fibers wound in the circumferential direction; a matrix resin in which the carbon fibers are embedded; and a structure which includes a plurality of carbon nanotubes having a bent shape with a bent portion, forms a network structure including a contact portion where the carbon nanotubes are in direct contact with each other, and is provided on surfaces of the carbon fibers.

According to another aspect of the invention, there is provided a method for manufacturing a rotary member. The method includes: a structure forming process of immersing carbon fibers in a dispersion in which carbon nanotubes having a bent shape with a bent portion are dispersed and to which ultrasonic vibration is applied to adhere the carbon nanotubes to the carbon fibers, thereby forming a structure having a network structure including a contact portion where the carbon nanotubes are in direct contact with each other on surfaces of the carbon fibers; and a molding process of applying a matrix resin to the carbon fibers in which the structure is formed, winding the carbon fibers applied with the matrix resin around a mandrel, curing the matrix resin, and pulling out the mandrel.

Advantageous Effects of Invention

According to the invention, since carbon fibers in which a structure by carbon nanotube is formed on surfaces thereof are embedded in a matrix resin, it is possible to provide a rotary member that is light in weight and has higher tensile strength.

DESCRIPTION OF EMBODIMENTS

Figure 1:
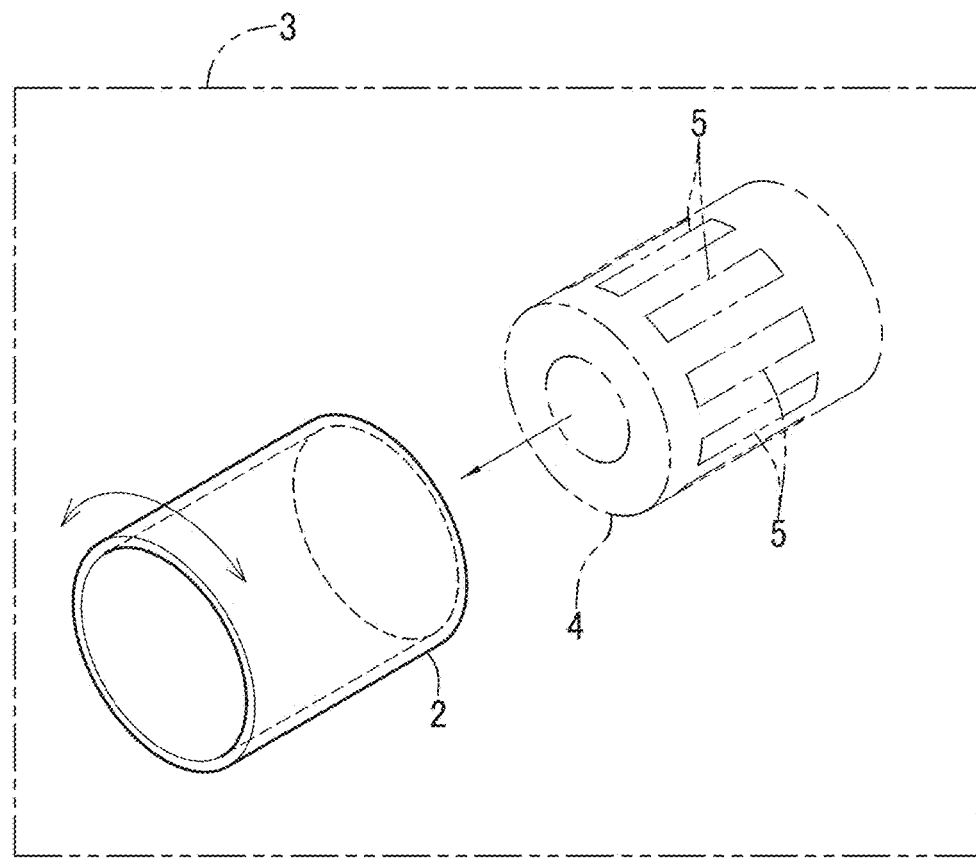
FIG. 1 is an explanatory diagram illustrating a configuration of main parts of a surface magnet type electric motor according to an embodiment.

FIG. 1 illustrates a rotary member 2 according to an embodiment. The rotary member 2 of this example is provided as a scattering prevention member for a surface magnet type electric motor 3. The rotary member 2 is an annular body, and has a cylindrical shape in this example. The rotary member 2 is fitted around a rotor 4. That is, the rotor 4 is press-fit into the hollow inside of the rotary member 2 and is fixed, and the rotary member 2 rotates integrally with the rotor 4. Accordingly, the rotary member 2 rotates in a circumferential direction thereof. A plurality of permanent magnets 5 are embedded in an outer circumferential surface of the rotor 4 with predetermined intervals along a circumferential direction of the rotor 4. The rotary member 2 constrains the permanent magnets 5 against a centrifugal force so that the permanent magnets 5 are not peeled off and scattered to an outer side in a diameter direction of the rotor 4 due to the centrifugal force that acts on the permanent magnets 5 during high-speed rotation of the rotor 4. Note that, the rotary member 2 may have a ring shape with a narrow width (a length in an axial direction is short), or the like. In addition, a plurality of ring-shaped members with a narrow width may be used in combination.

Figure 2:
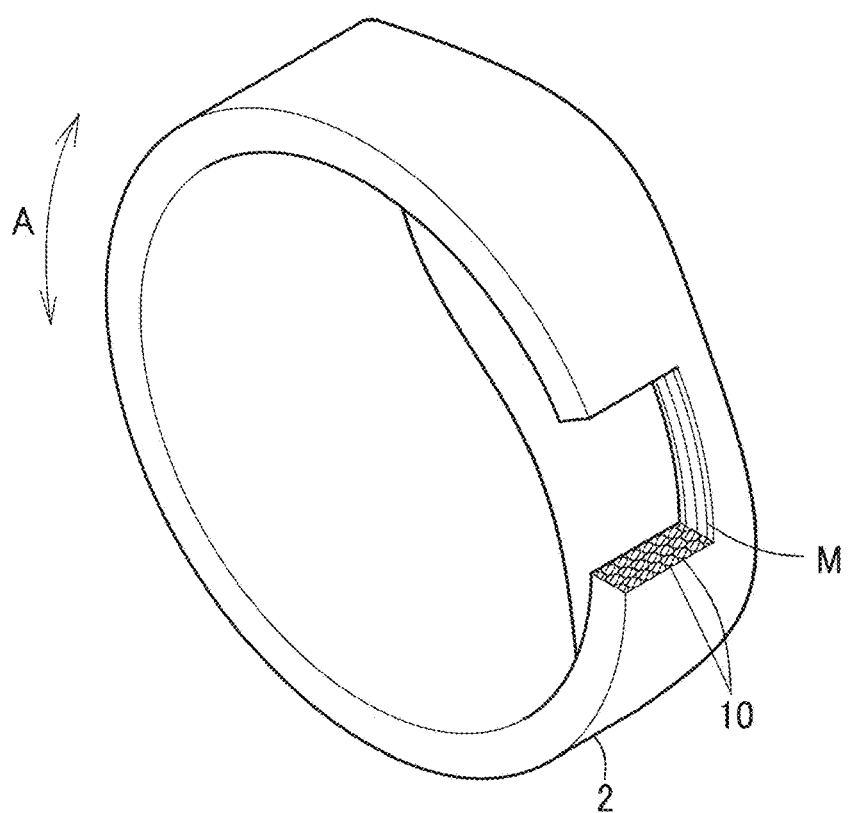
FIG. 2 is a partial cross-sectional view illustrating a composite material in a rotary member.

As schematically illustrated in FIG. 2, the rotary member 2 is a carbon fiber-reinforced molded article (carbon fiber-reinforced plastic) including a composite material 10, and a matrix resin M in which carbon fibers 11 (refer to FIG. 3) of the composite material 10 are embedded. The composite material 10 (carbon fibers 11) is wound in a circumferential direction, that is, a rotation direction (direction A in the drawing) of the rotary member 2 and a plurality of the composite materials 10 form one or more fiber layers in a diameter direction of the rotary member 2. The fiber layers are constituted by the composite materials 10 which are densely arranged in an axial direction.

Each of the composite materials 10 is wound in a circumferential direction of the rotary member 2. The configuration "winding in the circumferential direction of the rotary member 2" represents that the composite material 10 has a component along the circumferential direction of the rotary member 2, that is, the composite material 10 is wound at a predetermined oblique angle ($\neq 0°$) with respect to the axial direction of the rotary member 2. Accordingly, as to be described later, each of the fiber layers is formed by hoop winding (parallel winding) in which the composite material 10 is wound around an outer circumferential surface of a mandrel to be approximately perpendicular (oblique angle≈90°) to an axial center thereof or helical winding (spiral winding) in which the composite material 10 is wound at an oblique angle less than 90° with respect to the axial center. The oblique angle is for preventing a hoop layer from collapsing during ring assembly or the like and can be arbitrarily determined from the characteristics required for the rotary member 2. In a case where a plurality of fiber layers exist, the oblique angle can be determined for every fiber layer.

Note that, in FIG. 2, for convenience of explanation, the composite material 10 is exaggeratedly drawn, and a cross-section of each composite material 10 is drawn to be distinguished as a circle, but actually, the cross-section is not distinguished in this manner.

[Composite Material]

Figure 3:
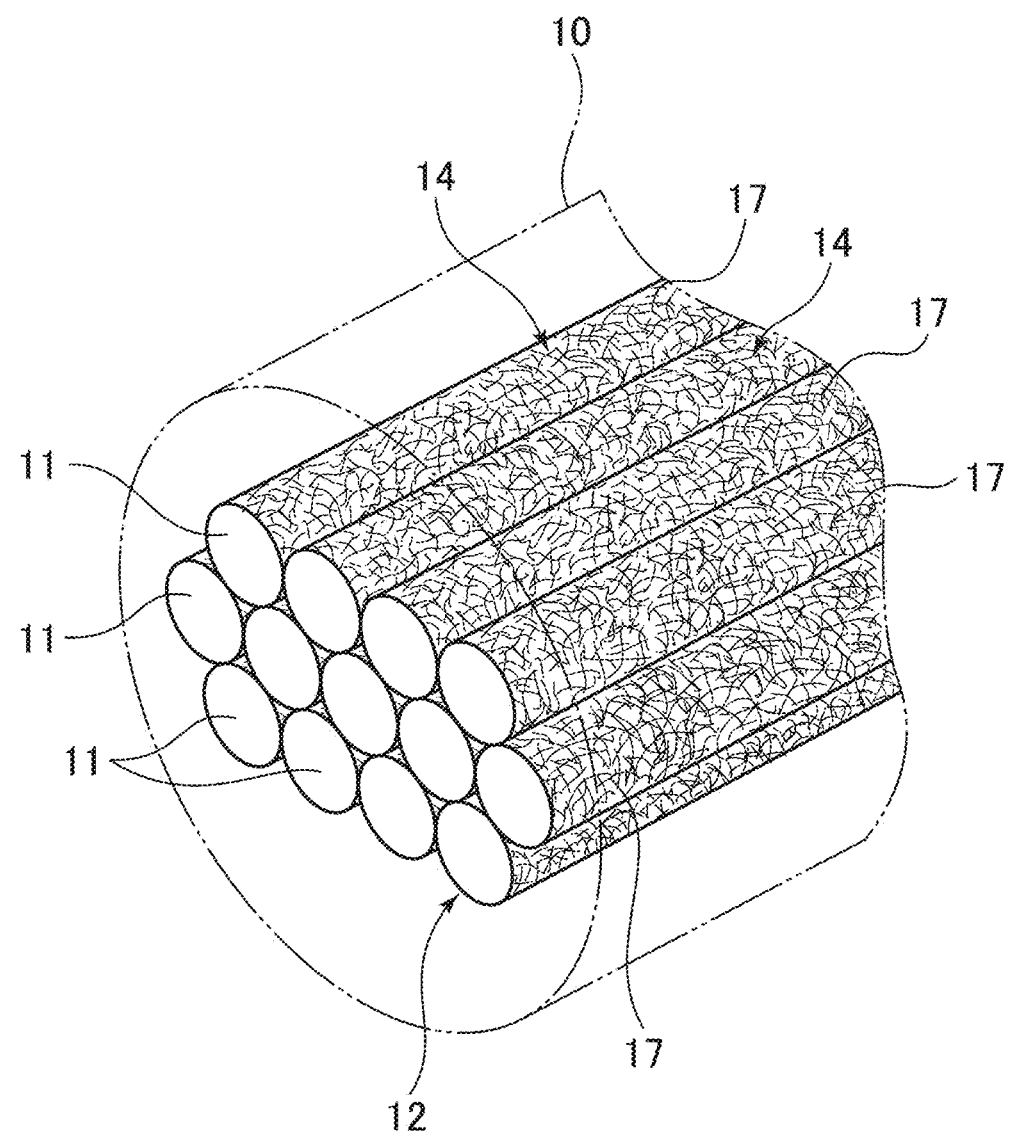
FIG. 3 is an explanatory diagram illustrating a configuration of the composite material.

In FIG. 3, the composite material 10 includes a carbon fiber bundle 12 in which a plurality of continuous carbon fibers 11 are grouped together. A structure 14 is formed on a surface of the carbon fibers 11, and a first sizing agent 15 (refer to FIG. 4) is applied to the structure 14.

The carbon fibers 11 which constitute the carbon fiber bundle 12 are not substantially entangled with each other, and a fiber axis direction of each of the carbon fibers 11 is aligned. The fiber axis direction is a direction (extension direction) of an axis of the carbon fiber 11. In this example, the carbon fiber bundle 12 is constituted by 12000 carbon fibers 11. The number of the carbon fibers 11 which constitute the carbon fiber bundle 12 is not particularly limited, and may be set, for example, within a range of 10000 to 100000. Note that, in FIG. 3, only a dozen pieces of the carbon fibers 11 are drawn for convenience of explanation. In addition, in this example, the composite material 10 includes the plurality of carbon fibers 11 including the structure 14 and the first sizing agent 15, but the composite material 10 may be one carbon fiber 11 including the structure 14 and the first sizing agent 15. Note that, in the following description, a fiber (in this example, the carbon fiber 11) in which the structure 14 is formed on a surface thereof is referred to as a CNT composite fiber in combination with the structure 14.

Entanglement of the carbon fibers 11 in the carbon fiber bundle 12 can be evaluated with the degree of disturbance of the carbon fibers 11. For example, the carbon fiber bundle 12 is observed with a scanning electron microscope (SEM) at a constant magnification, and lengths of a predetermined number of (for example, 10) carbon fibers 11 in an observation range (a predetermined length range of the carbon fiber bundle 12) are measured. The degree of disturbance of the carbon fibers 11 can be evaluated on the basis of a variation, a difference between a maximum value and a minimum value, and a standard deviation of the lengths which are obtained from the measurement results and relate to the predetermined number of carbon fibers 11. In addition, it can be determined that the carbon fibers 11 are not substantially entangled by measuring the degree of entanglement, for example, in conformity to a method of measuring the degree of entanglement in JIS L1013:2010 "Testing methods for man-made filament yarns". The smaller the measured degree of entanglement is, the less the carbon fibers 11 are entangled with each other in the carbon fiber bundle 12.

In the carbon fiber bundle 12 in which the carbon fibers 11 are not substantially entangled with each other, or are less entangled with each other, the carbon fibers 11 are likely to be uniformly opened. According to this, it is easy to cause a CNT 17 to uniformly adhere to the carbon fibers 11 as a raw fiber. In addition, in the CNT composite fiber, the matrix resin M is uniformly impregnated into the carbon fiber bundle 12, and each of the carbon fibers 11 can contribute to the strength.

As the carbon fibers 11, a PAN-based or pitch-based fiber obtained by baking an organic fiber such as polyacrylic nitrile, rayon, and pitch which are derived from petroleum, coal, and coal tar, a fiber obtained by baking an organic fiber derived from wood or a plant fiber, and the like can be used without particular limitation, and the carbon fibers 11 may be commercially available carbon fibers. In addition, with regard to a diameter and a length of the carbon fibers 11, there is no particular limitation. As the carbon fibers 11, a fiber having a diameter in a range of approximately 5 μm to 20 μm can be preferably used, and a fiber having a diameter in a range of approximately 5 μm to 10 μm can be more preferably used. As the carbon fibers 11, a long fiber can be preferably used, and a length thereof is preferably 50 m or longer, more preferably in a range of 100 m to 100000 m, and still more preferably in a range of 100 m to 10000 m. Note that, when a prepreg or a carbon fiber-reinforced molded article is formed, the carbon fibers 11 may be cut short.

As described above, the structure 14 is formed on the surface of each of the carbon fibers 11. In the structure 14, a plurality of carbon nanotubes (hereinafter, referred to as "CNTs") 17 are entangled. The CNTs 17 which constitute the structure 14 are uniformly dispersed and entangled across substantially the entire surface of each of the carbon fibers 11, and form a network structure in which the plurality of CNTs 17 are connected in a state of being entangled with each other. The connection stated here includes physical connection (simple contact) and chemical connection. The CNTs 17 come into direct contact with each other without intervening materials such as a dispersing agent including a surfactant, and adhesive therebetween.

Some of the CNTs 17 which constitute the structure 14 directly adhere and are fixed to the surfaces of the carbon fibers 11. According to this, the structure 14 directly adheres to the surfaces of the carbon fibers 11. A structure in which the CNTs 17 directly adhere to the surfaces of the carbon fibers 11 represents that the CNTs 17 directly adhere to the carbon fibers 11 in a state in which a dispersing agent such as a surfactant, adhesive, or the like is not interposed between the CNTs 17 and the surfaces of the carbon fibers 11, and adhesion (fixing) is obtained due to bonding by Van der Waals force. Since some of the CNTs 17 which constitute the structure 14 directly adhere to the surfaces of the carbon fibers 11, it enters a direct contact state in which the structure 14 comes into direct contact with the surfaces of the carbon fibers 11 without interposing the dispersing agent, the adhesive, or the like.

In addition, some of the CNTs 17 which constitute the structure 14 are entangled with other CNTs 17 and are fixed to the carbon fibers 11 without direct contact with the surfaces of the carbon fibers 11. In addition, some of the CNTs 17 directly adhere to the surfaces of the carbon fibers 11 and are entangled with other CNTs 17 to be fixed to the carbon fibers 11. In the following description, fixing of the CNTs 17 to the carbon fibers 11 is collectively referred to as adhesion to the carbon fibers 11. Note that, a state in which the CNTs 17 are entangled or intertwined includes a state in which some of the CNTs 17 are pressed against other CNTs 17.

In addition to direct adhesion with the surfaces of the carbon fibers 11, some of the CNTs 17 which constitute the structure 14 are not in direct contact with the surfaces of the carbon fibers 11 but are fixed to the carbon fibers 11 by entanglement with other CNTs 17, or the like. Accordingly, the structure 14 of this example includes more CNTs 17 than a structure in which the CNTs directly adhere to the surfaces of the carbon fibers as in the structure of the composite material of the related art. That is, the number of the CNTs 17 which adhere to the carbon fibers 11 further increases in comparison to the related art.

As described above, the plurality of CNTs 17 are connected to each other without intervening materials between surfaces, thereby constituting the structure 14. Accordingly, the composite material 10 exhibits performance of electric conductivity and thermal conductivity derived from the CNTs. In addition, since the CNTs 17 adhere to the surfaces of the carbon fibers 11 without intervening materials, the CNTs 17 constituting the structure 14 are less likely to be peeled off from the surfaces of the carbon fibers 11, and in the rotary member 2 including the composite material 10, mechanical strength including tensile strength is improved.

As described above, in the rotary member 2, the carbon fiber bundle 12 constituted by the plurality of carbon fibers 11 on which the structure 14 is formed, that is, a plurality of CNT composite fibers is impregnated with the matrix resin M, and the matrix resin M is cured therein. Since the structure 14 is impregnated with the matrix resin M, the structure 14 of each of the carbon fibers 11 is fixed to the surface of the carbon fiber 11 and the matrix resin M. This results in a state in which each of the carbon fibers 11 is strongly bonded to the matrix resin M, that is, interface adhesion strength between the carbon fiber 11 and the matrix resin M is high, and tensile strength of the rotary member 2 is high.

Figure 14:
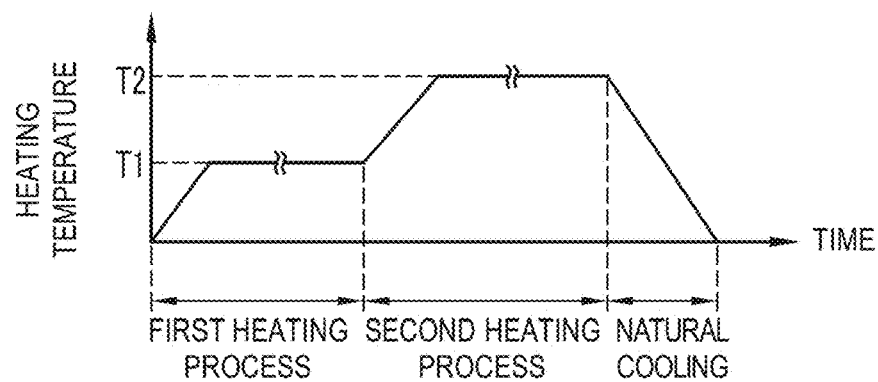
FIG. 14 is a graph showing an example in which a heating temperature is changed step by step when curing a matrix resin.

Since the CNTs 17 are set to have a bent shape as to be described later, in comparison to a case of using CNTs with high linearity, the number of CNTs 17 adhered to the carbon fibers 11 further increases, the thickness of the structure 14 is larger, and the structure 14 has a configuration in which the CNTs 17 are knitted like a non-woven fabric fiber. A region ("hereinafter, referred to as a composite region") 18 where the structure 14 is impregnated with the matrix resin M and the matrix resin M is cured is formed at the periphery of each of the carbon fibers 11 of the rotary member 2 (refer to FIG. 14). By the composite region 18, interface adhesion strength between the carbon fibers 11 and the matrix resin M is further raised, and the tensile strength of the rotary member 2 becomes higher. In addition, by interposition of the CNT 17 in a resin portion between adjacent carbon fibers 11, an interaction between carbon fibers becomes stronger and a decrease in strength caused by defects existing in the carbon fibers 11 is supported by other adjacent carbon fibers 11, thereby the decrease in strength caused by the defects is suppressed.

Note that, examples of properties of the carbon fiber-reinforced molded article (the rotary member 2) which are improved by adhering the CNT 17 on the surfaces of the carbon fibers 11 and forming the structure 14 having the large thickness and the non-woven fabric shape include elastic modulus, vibration damping properties (damping properties), durability against repetitive bending, and the like in addition to the tensile strength.

The structure 14 that is formed on each of the plurality of carbon fibers 11 has an independent structure, and the structure 14 of one of the carbon fibers 11 does not share the same CNT 17 with the structure 14 of another carbon fiber 11. That is, the CNTs 17 contained in the structure 14 provided in the one carbon fiber 11 is not contained in the structure 14 provided in the other carbon fiber 11.

Figure 4:
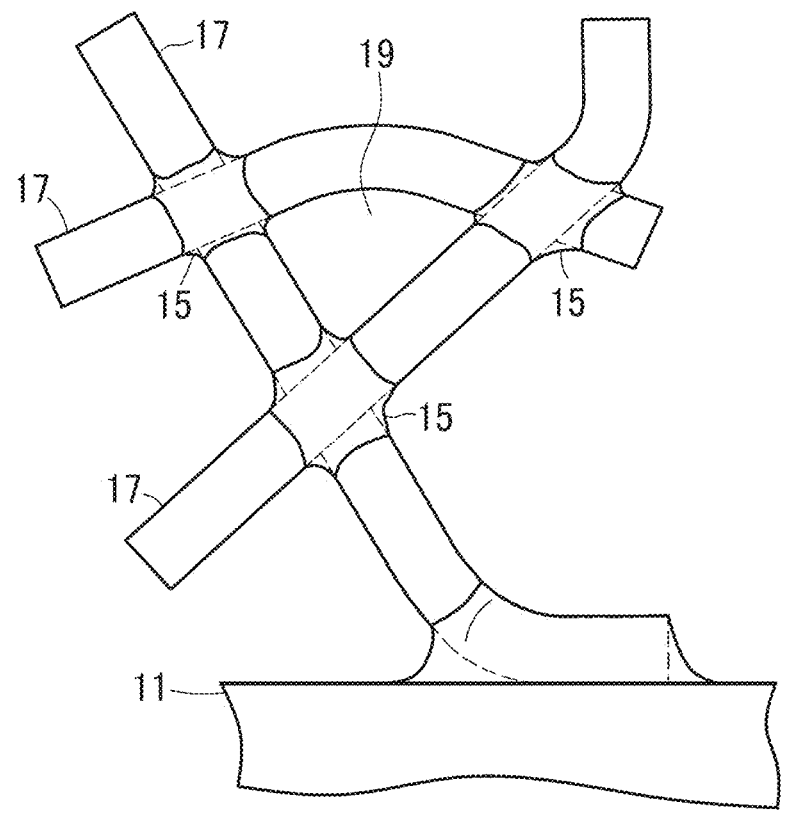
FIG. 4 is an explanatory diagram illustrating an adhesion state of a first sizing agent to CNTs.

As illustrated in FIG. 4, the first sizing agent 15 is applied to the CNTs 17 in a state of wrapping and covering a contact portion at which the CNTs 17 are in direct contact with each other. The first sizing agent 15 includes a carbodiimide-derived structure obtained by reacting a functional group existing on surfaces of the CNTs 17, for example, a hydrophilic group such as a hydroxyl group (—OH) and a carboxyl group (—COOH) with a carbodiimide group (—N=C=N—) of a carbodiimide compound. That is, the first sizing agent 15 cross-links the CNTs 17 which are in direct contact with each other by the carbodiimide-derived structure. According to this, the CNTs 17 are fixed by contact portion where the CNTs 17 are in direct contact with each other, and the first sizing agent 15.

A method of applying the function group on the surfaces of the CNTs 17 is not particularly limited, and the functional group may be applied as a result of various treatments performed after manufacturing the CNTs 17, or may be applied by a functional group application treatment. As the functional group application treatments, for example, a wet anodic electrolytic oxidation method, an ozone oxidation method, and the like can be employed. When a functional group exists on the surfaces of the CNTs 17 at the time of a first sizing treatment of applying the first sizing agent 15 to the structure 14, timing of applying the functional group to the surfaces of the CNTs 17 is not particularly limited.

The carbodiimide compound is a compound including two or more structures shown in Formula (1) in which n is an integer of one or greater. For example, R is hydrocarbon. Examples of the hydrocarbon include aliphatic hydrocarbon, alicyclic hydrocarbon, and aromatic hydrocarbon.

[Chemical Formula 1]

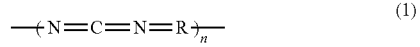

(1)

As the carbodiimide compound, for example, as described in JP-A-2007-238753 or the like, a compound that is used as a curing agent for an aqueous resin or the like can be used, and a commercially available compound may be used. Examples of the commercially available carbodiimide compound include "Carbodilite V-02" (trade name, manufactured by Nisshinbo Chemical Inc.), and the like. The carbodiimide compound including a hydrophilic segment is dissolved in water, and functions as an aqueous cross-linking agent that cross-links the CNTs 17.

Figure 5:
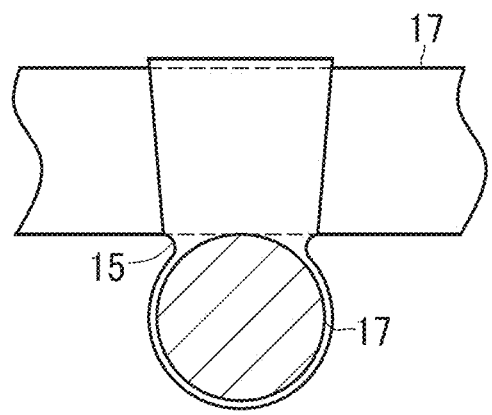
FIG. 5 is an explanatory diagram illustrating an adhesion state of the first sizing agent in a contact portion where CNTs are in contact with each other.

As illustrated in FIG. 5, direct contact of the CNTs 17 at the contact portion is maintained, and the CNTs 17 are cross-linked by the first sizing agent 15 around the contact portion where surfaces of the CNTs 17 are close to each other.

As described above, the first sizing agent 15 acts a cross-linking agent, and cross-links the CNTs 17 which constitute the structure 14 and are in contact with each other. According to this, the adhesion state of the CNTs 17 becomes stronger, and the structure 14 is hard to collapse.

In addition, as illustrated in FIG. 4, the first sizing agent 15 adheres to the carbon fibers 11 and the CNTs 17 in a state of wrapping and covering a contact portion at which the carbon fibers 11 and the CNTs 17 which are in direct contact with the carbon fibers 11. As in the case of the CNTs 17, the first sizing agent 15 cross-links the carbon fibers and the CNTs 17 by the carbodiimide-derived structure obtained when the carbodiimide group reacts with the functional group on the surfaces of the carbon fibers 11 and the CNTs 17. As described above, the first sizing agent 15 cross-links the carbon fibers and the CNTs 17, and thus the adhesion state of the CNTs 17 to the carbon fibers 11 becomes stronger and the structure 14 is hard to be peeled off from the carbon fibers 11.

By the first sizing agent 15, when manufacturing the composite material 10 or the rotary member 2, detachment of the structure 14 from the carbon fibers 11 and detachment of the CNTs 17 from the structure 14 can be suppressed, and thus it is possible to prevent a decrease in the interface adhesion strength, and a deterioration of properties including the tensile strength of the rotary member 2, and it is possible to obtain uniform preferred properties.

Figure 6:
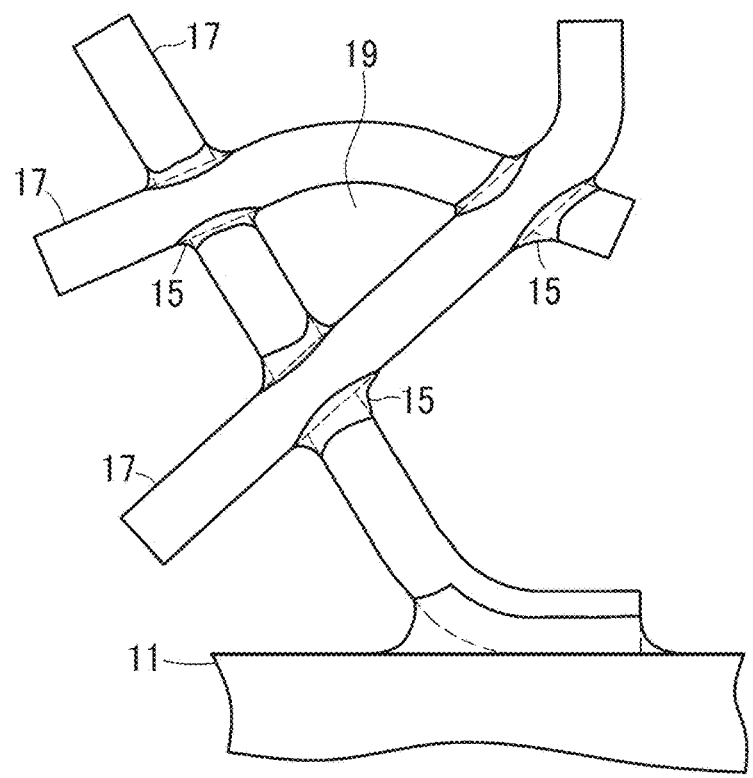
FIG. 6 is an explanatory diagram illustrating another adhesion state of the first sizing agent to the CNTs.
Figure 7:
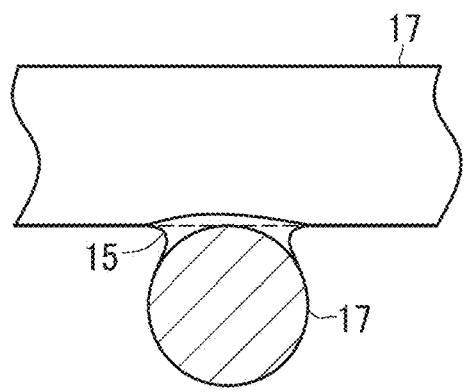
FIG. 7 is an explanatory diagram illustrating still another adhesion state of the first sizing agent in a contact portion where the CNTs are in contact with each other.

Note that, when direct contact of the CNTs 17 is maintained, and the CNTs 17 are cross-linked around a contact portion where the CNTs 17 are in direct contact with each other by the first sizing agent 15, the CNTs 17 may be wrapped and covered with the first sizing agent 15 as described above, or may not be wrapped and covered as illustrated in FIG. 6 and FIG. 7. Similarly, when the direct contact between the carbon fibers 11 and the CNTs 17 is maintained, the carbon fibers 11 and the CNTs 17 are cross-linked around the contact portion where carbon fibers 11 and the CNTs 17 are in direct contact with each other by the first sizing agent 15, as illustrated in FIG. 6, the first sizing agent 15 may not wrap and cover the CNTs 17.

Note that, in the structure 14, a gap (mesh) 19 surrounded by the plurality of CNTs 17 is formed by the CNTs 17. It is preferable that the first sizing agent 15 does not fill up the gap 19 so as not to block impregnation with the matrix resin M into the structure 14. It is preferable that a mass ratio (Rm) of the sizing agent which is a ratio of the mass of the first sizing agent 15 adhered to the structure 14 to the mass of the carbon fibers 11 is preferably set to a range of 0.6% to 1.1% so as not to fill up the gap 19.

The mass of the carbon fibers 11 per unit length increases or decreases depending on the size of the diameter of the carbon fibers 11, and the mass of the first sizing agent 15 suitable for adhesion to the structure 14 also increases or decreases. However, typically, in a range of the diameter of the carbon fibers 11 used in a carbon fiber-reinforced molded article, a variation of the mass ratio Rm of the sizing agent which is suitable for a variation of the diameter of the carbon fibers 11 is minute, and even in carbon fibers 11 having any diameter, filling of the gap 19 can be prevented within the above-described range of the mass ratio Rm of the sizing agent. When the mass ratio Rm of the sizing agent to the carbon fibers 11 having a diameter in a range of 4 μm to 8

µm is 0.6% to 1.1%, it is confirmed that the gap 19 is not filled up. When the structure 14 is impregnated with the matrix resin M and the matrix resin M is cured, the matrix resin M is hard to be peeled off from the structure 14 and further from the carbon fibers 11, and thus there is an advantage in that mechanical strength is improved.

The CNTs 17 adhered to the carbon fibers 11 have a bent shape. The bent shape of the CNTs 17 is obtained because a bent portion is provided due to existence of a five-membered ring, a seven-membered ring, and the like of carbon in a graphite structure of the CNTs 17. The bent shape is a shape from which the CNTs 17 can be evaluated to be curved, bent, or the like from observation with a SEM. For example, the bent shape of the CNTs 17 represents that the bent portion exists at least at one site or more per an average length of a use range of the CNTs 17 to be described later. Even in a case where the CNTs 17 is long, the CNTs 17 having the bent shape adhere to the surfaces of the carbon fibers 11 which are curved surfaces in various postures. In addition, the CNTs 17 having the bent shape are likely to form a space (gap) between the surfaces of the carbon fibers 11 to which the CNTs 17 adhere, or between the adhered CNTs 17, and another CNT 17 enters the space. According to this, when using the CNTs 17 having the bent shape, the number of the CNTs 17 adhered to the carbon fibers 11 (the number of the CNTs 17 forming the structure 14) further increases in comparison to the case of using CNTs having a shape with high linearity.

The length of the CNTs 17 is preferably within a range of 0.1 pm to 10 pm. When the length is 0.1 pm or longer, the CNTs 17 can more reliably form the structure 14 in which the CNTs 17 are entangled and come into direct contact with each other or are directly connected to each other, and it is possible to more reliably form the space which the other CNT 17 enters as described above. In addition, when the length of the CNTs 17 is 10 pm or less, the CNTs 17 do not adhere between the carbon fibers 11. That is, as described above, a CNT 17 that is contained in the structure 14 provided in one carbon fiber 11 is not contained in the structure 14 provided in another carbon fiber 11.

The length of the CNTs 17 is more preferably within a range of 0.2 pm to 5 pm. When the length of the CNTs 17 is 0.2 pm or longer, the number of the CNTs 17 adhered increases and the structure 14 can be made thick. When the length is 5 pm or less, when causing the CNTs 17 to adhere to the carbon fibers 11, the CNTs 17 are less likely to aggregate, and the CNTs 17 are likely to be more evenly dispersed. As a result, the CNTs 17 more evenly adhere to the carbon fibers 11.

Note that, with regard to the CNTs adhered to the carbon fibers 11, mixing-in of CNTs with high linearity or mixing-in of CNTs having a length out of the above-described range are not excluded. For example, even in a case where mixing-in occurs, since the CNTs with high linearity enter a space formed by the CNTs 17, it is possible to increase the number of the CNTs adhered to the carbon fibers 11.

It is preferable that an average diameter of the CNTs 17 is within a range of 0.5 nm to 30 nm, and more preferably a range of 3 nm to 10 nm. When the diameter is 30 nm or less, the CNTs 17 are very flexible and are likely to adhere to the carbon fibers 11 along the surfaces thereof, and are likely to be fixed to the carbon fibers 11 in a state of being entangled with other CNTs 17. In addition to this, formation of the structure 14 becomes more reliable. In addition, when the diameter is 10 nm or less, bonding between the CNTs 17 constituting the structure 14 becomes strong. Note that, the diameter of the CNTs 17 is set as a value measured by using a transmission electron microscope (TEM) photograph. The CNTs 17 may be a single-layer structure or a multi-layer structure, but the multi-layer structure is preferable.

The number of the CNTs 17 adhered to the carbon fibers 11 can be evaluated with the thickness of the structure 14 (a length in a diameter direction of the carbon fibers 11). For example, the thickness of each portion of the structure 14 can be measured as follows. Specifically, a part of the structure 14 on the surfaces of the carbon fibers 11 is bonded to a cellophane tape or the like and is peeled off, and a cross-section of the structure 14 remaining on the surfaces of the carbon fibers 11 is measured with a SEM or the like to acquire the thickness. In order to almost uniformly cover a measurement range of a predetermined length along a fiber axis direction of the carbon fibers 11, the thickness of the structure 14 is measured at ten sites in the measurement range, but an average of the measured values is set as the thickness of the structure 14. For example, the length of the measurement range is set to a length that is five times an upper limit of a range of the length of the CNTs 17 described above.

The thickness (average) of the structure 14 which is obtained as described above is preferably within a range of 10 nm to 300 nm, more preferably within a range of 15 nm to 200 nm, and still more preferably within a range of 50 nm to 200 nm. When the thickness of the structure 14 is 200 nm or less, an impregnation property with a resin between the carbon fibers 11 is satisfactory.

In addition, an adhesion state of the CNTs 17 to the carbon fibers 11 can be evaluated by employing a CNT mass ratio Rc that is a mass ratio of the CNTs 17 adhered to the carbon fibers 11 with respect to the CNT composite fiber. When the mass (hereinafter, referred to as "CF mass") of only the carbon fibers 11 having a predetermined length is set as Wa, and the mass (hereinafter, referred to as "CNT mass") of the CNTs 17 adhered to the carbon fibers 11 is set as Wb, the CNT mass ratio Rc is obtained as "Rc=Wb/(Wa+Wb)".

It is preferable that the CNTs 17 uniformly adhere to the carbon fibers 11, and it is preferable that the CNTs 17 adhere to the carbon fibers 11 to cover the surfaces thereof. The adhesion state including uniformity of the CNTs 17 with respect to the carbon fiber 11 is observed with a SEM, and an obtained image can be visually evaluated. In this case, it is preferable to make an evaluation by observing a plurality of sites (for example, 10 sites) to approximately evenly cover a range of a predetermined length (for example, a range of 1 cm, 10 cm, or 1 m) of the carbon fibers 11 along the fiber axis direction.

In addition, adhesion uniformity of the CNTs 17 to the carbon fibers 11 can be evaluated by using the above-described CNT mass ratio Rc. The CNT mass ratio Rc is preferably 0.001 to 0.008. When CNT mass ratio Rc is 0.001 or more, in a case of obtaining the rotary member 2, the property improving effect due to the structure 14 as described above can be reliably obtained. When the CNT mass ratio Rc is 0.008 or less, resin impregnation of the structure 14 with the matrix resin M becomes reliable. In addition, the CNT mass ratio Rc is more preferably 0.002 to 0.006. When the CNT mass ratio Rc is 0.002 or more, the structure 14 (CNTs 17) more reliably functions between almost all carbon fibers 11. When the CNT mass ratio Rc is 0.006 or less, resin impregnation of the structure 14 with the matrix resin M becomes reliable, and even in a case where a ratio of the matrix resin M in the rotary member 2 is low, the structure 14 more reliably functions. Furthermore, even in a case where the ratio of the matrix resin M is low, the CNTs 17 exist in a resin between carbon fibers at a high concentration, and thus toughness strength can be improved due to a reinforcing effect of the CNTs 17.

It is preferable that a standard deviation s of respective CNT mass ratios Rc of ten measurement sites set within a range (hereinafter, referred to as "evaluation range") of 1 m in the length of one piece of the carbon fibers 11 is 0.0005 or less, and more preferably 0.0002 or less. In addition, a ratio of the standard deviation s to an average of the CNT mass ratio Rc is preferably 40% or less, and more preferably 15% or less. It is preferable that the ten measurement sites are set to almost uniformly cover the evaluation range. The standard deviation s becomes an index of a variation in the adhesion number (adhesion amount) of the CNTs 17 adhered to the carbon fibers 11 and the thickness of the structure 14, and the smaller the variation is, the smaller a value of the standard deviation is. Accordingly, as the standard deviation s is smaller, it is more preferable. The variation in the adhesion number of the CNTs 17 and the thickness of the structure 14 is exhibited as a difference of properties derived from the CNTs 17 in the composite material 10 and the rotary member 2 using the composite material 10. When the standard deviation s is 0.0005 or less, the properties derived from the CNTs 17 in the composite material 10 and the carbon fiber-reinforced molded article are more reliably exhibited, and when the standard deviation s is 0.0002 or less, the properties derived from the CNTs 17 are sufficiently and reliably exhibited. Note that, the standard deviation s is obtained by Expression (2). A value n in Expression (2) represents the number of measurement sites (n=10 in this example), a value Ri represents the CNT mass ratio Rc of the measurement sites, and a value Ra represents an average of the CNT mass ratio Rc.

[Formula 1]

$$s = \sqrt{\frac{1}{n}\sum_{i=1}^{n}(Ri-Ra)^2} \quad (2)$$

[Measurement of CNT Mass Ratio]

The CNT mass ratio Rc is obtained as follows by cutting the carbon fiber bundle 12 (for example, approximately 12000 CNT composite fibers) by approximately 1 m with respect to a measurement site where the CNT mass ratio Rc is desired to be obtained as a measurement sample.

(1) The measurement sample is put into a solution (hereinafter, referred to as "measurement solution") that becomes a dispersion medium of the CNTs 17. As the measurement solution, for example, a solution obtained by putting a dispersing agent into NMP (N-methyl-2-pyrrolidone, CAS registration number: 872-50-4) is used. The dispersing agent is added to the measurement solution in order for the CNTs 17 not to re-adhere to the carbon fibers 11, but may not be added. For example, the amount of the measurement solution is 100 ml with respect to 10 g of measurement sample.

(2) A difference between the mass of the measurement solution before putting the measurement sample and the mass of the measurement solution including the measurement sample after being put is measured, and the difference is set as the mass of the measurement sample, that is, the sum (Wa+Wb) of the CF mass Wa of the carbon fibers 11 and the CNT mass Wb of the CNTs 17 adhered to the carbon fibers 11.

(3) The measurement solution including the measurement sample is heated to completely separate the CNTs 17 adhered to the carbon fibers 11 from the carbon fibers 11 and to disperse the CNTs 17 in the measurement solution.

(4) Absorbance (transmittance) of the measurement solution in which the CNTs 17 are dispersed is measured by using an absorption photometer. The concentration of the CNTs 17 in the measurement solution (hereinafter, referred to as "CNT concentration") is obtained from a measurement result by the absorption photometer and a calibration curve created in advance. The CNT concentration is a mass percent concentration given as "C=W2/(W1+W2)" when a value of the CNT concentration is set as C, the mass of the measurement solution is set as W1, and the mass of the CNTs 17 included in the measurement solution is set as W2.

(5) The CNT mass Wb of the CNTs 17 in the measurement solution is obtained from the obtained CNT concentration and the mass of the measurement solution before putting the measurement sample.

(6) The CNT mass ratio Rc (=Wb/(Wa+Wb)) is calculated from the sum (Wa+Wb) of the CF mass Wa and the CNT mass Wb which is obtained in (2), and the CNT mass (Wb) of the CNTs 17.

In measurement of the absorbance, a spectrophotometer (for example, SolidSpec-3700 manufactured by SHIMADZU CORPORATION, or the like) can be used, and as a measurement wavelength, for example, 500 nm or the like may be used. In addition, in the measurement, the measurement solution is preferably accommodated in a quartz cell. In addition, absorbance of a dispersion medium that does not contain impurities other than the dispersing agent may be measured as a reference, and the concentration C of the CNTs 17 can be obtained by using a difference between the absorbance of the measurement solution in which the CNTs 17 are dispersed and the reference. Note that, in the measurement of the CNT mass ratio Rc, a carbon fiber bundle obtained by removing the first sizing agent 15 from the carbon fiber bundle 12 is used. However, in a case where the mass of the first sizing agent 15 to the mass of the carbon fibers 11 is approximately 1/100, presence or absence of adhesion of the first sizing agent 15, that is, the mass of the first sizing agent 15 substantially has no influence on a preferable range of the CNT mass ratio Rc. Accordingly, the mass of the CNT composite fiber to which the first sizing agent 15 adheres can be regarded as the sum (Wa+Wb) of the CF mass Wa and the CNT mass Wb.

In a case of evaluating uniformity by using the CNT mass ratio Rc, 10 sites of measurement sites are set to almost uniformly cover an evaluation range (for example, a length of 1 m) of the carbon fiber bundle 12 to be evaluated. With regard to the 10 sites of measurement sites, both ends of the evaluation range and eight sites between the ends are set, and the CNT mass ratio Rc is obtained with respect to each of the measurement sites in the above-described procedure.

[Measurement of Mass Ratio of Sizing Agent]

In measurement of a mass ratio Rm of the sizing agent, for example, three CNT composite fibers are cut out from the carbon fiber bundle 12 prepared by causing the first sizing agent 15 to adhere to the structure 14 of each of the carbon fibers 11 and are set as a measurement sample. The mass ratio Rm is obtained as follows. For example, a length of the CNT composite fibers cut out as a measurement sample is set to 5 m. Note that, the number and the length of the CNT composite fibers set as the measurement sample are not limited thereto.

(1) The measurement sample is put into a measurement solution of the CNTs 17. Conditions of the measurement solution and the dispersion medium are the same as in measurement of the CNT mass ratio Rc described above.

(2) A difference between the mass of the measurement solution before putting the measurement sample, and the mass of the measurement solution including the measurement sample after being put is measured, the difference is set as the mass of the measurement sample, that is, the sum (Wa+Wb+Wc) of the CF mass Wa of the carbon fibers 11, the CNT mass Wb of the CNTs 17 adhered to the carbon fibers 11, and a sizing agent mass Wc of the first sizing agent 15 adhered to the CNTs 17.

(3) The measurement solution including the measurement sample is heated to completely separate the CNTs 17 adhered to the carbon fibers 11 from the carbon fibers 11 and to disperse the CNTs 17 in the measurement solution.

(4) Absorbance of the measurement solution in which the CNTs 17 are dispersed is measured by using an absorption photometer in a similar manner as in the case of measuring the CNT mass ratio Rc. A CNT concentration of the CNTs 17 in the measurement solution is obtained from the absorbance and a calibration curve created in advance. The CNT mass Wb in the measurement solution is obtained from the obtained CNT concentration and the mass of the measurement solution before putting the measurement sample.

(5) The CF mass Wa is specified from a catalog value of the carbon fibers 11 (raw fiber) which are used.

(6) A difference obtained by subtracting the CF mass Wa obtained in (5) and the CNT mass Wb obtained in (4) from the mass (Wa+Wb+Wc) of the measurement sample, and the difference is set as the sizing agent mass Wc of the first sizing agent applied to the measurement sample.

(7) The mass ratio Rm (=(Wc/Wa)×100%) of the sizing agent is calculated from the CF mass Wa obtained in (5) and the sizing agent mass WC obtained in (6).

Note that, in the measurement of the mass ratio Rm of the sizing agent described above, in a case of specifying the CF mass Wa from the catalog value of the carbon fibers 11 (raw fiber), the mass of the carbon fibers 11 (raw fiber) to which the sizing agent does not adhere is specified. The sizing agent stated here is a sizing agent that adheres to the surface of the carbon fibers 11 (raw fiber) for preventing entanglement or the like between the carbon fibers 11 (raw fiber), and is different from the first sizing agent. However, the mass of the sizing agent for preventing entanglement or the like is typically approximately 1/100 of the CF mass Wa of the carbon fibers 11, and in this case, presence or absence of adhesion of the sizing agent substantially does not have an influence on a preferable range of the mass ratio Rm of the sizing agent. Accordingly, in this case, the mass of the carbon fibers 11 to which the sizing agent adheres can be regarded as the CF mass Wa when obtaining the mass ratio Rm of the sizing agent.

In addition, the specifying of the CF mass Wa is not limited to specifying from the catalog value. For example, the mass of the carbon fibers 11 after separation of the CNTs 17 may be measured and set as the CF mass Wa. Furthermore, the CF mass Wa may be specified by measuring a mass with respect to a carbon fiber which is the same kind as the carbon fibers 11 used in the CNT composite fiber set as the measurement sample and to which the CNTs 17 do not adhere.

Figure 8:
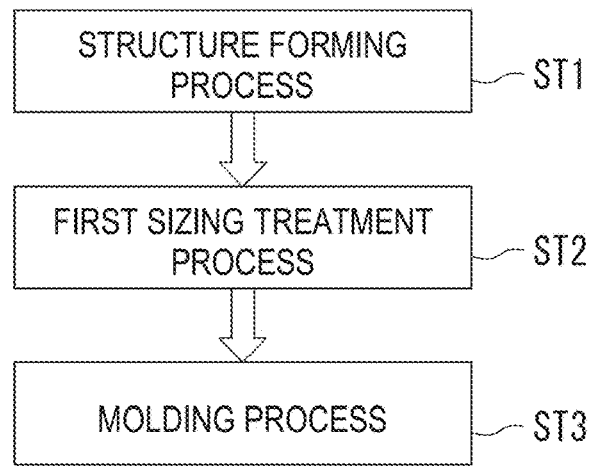
FIG. 8 is an explanatory diagram showing an overview of steps of manufacturing the rotary member.

As illustrated in FIG. 8, the rotary member 2 is manufactured through a structure forming process ST1, a first sizing treatment process ST2, and a molding process ST3. In the structure forming process ST1, the CNTs 17 are caused to adhere to each of the carbon fibers 11 (raw fiber) of the carbon fiber bundle 12, thereby forming the structure 14. For this, the carbon fiber bundle 12 is immersed in a CNT isolated dispersion (hereinafter, simply referred to as "dispersion") in which the CNTs 17 are isolated and dispersed, and mechanical energy is applied to the dispersion. The term "isolated and dispersed" represents a state in which the CNTs 17 are physically separated one by one and are dispersed in a dispersion medium without entanglement, and a state in which a ratio of an aggregate in which two or more CNTs 17 are aggregated in a bundle form is 10% or less. Here, when the ratio of the aggregate is 10% or more, aggregation of the CNTs 17 in the dispersion medium is promoted, and adhesion of the CNTs 17 to the carbon fibers 11 is inhibited.

Figure 9:
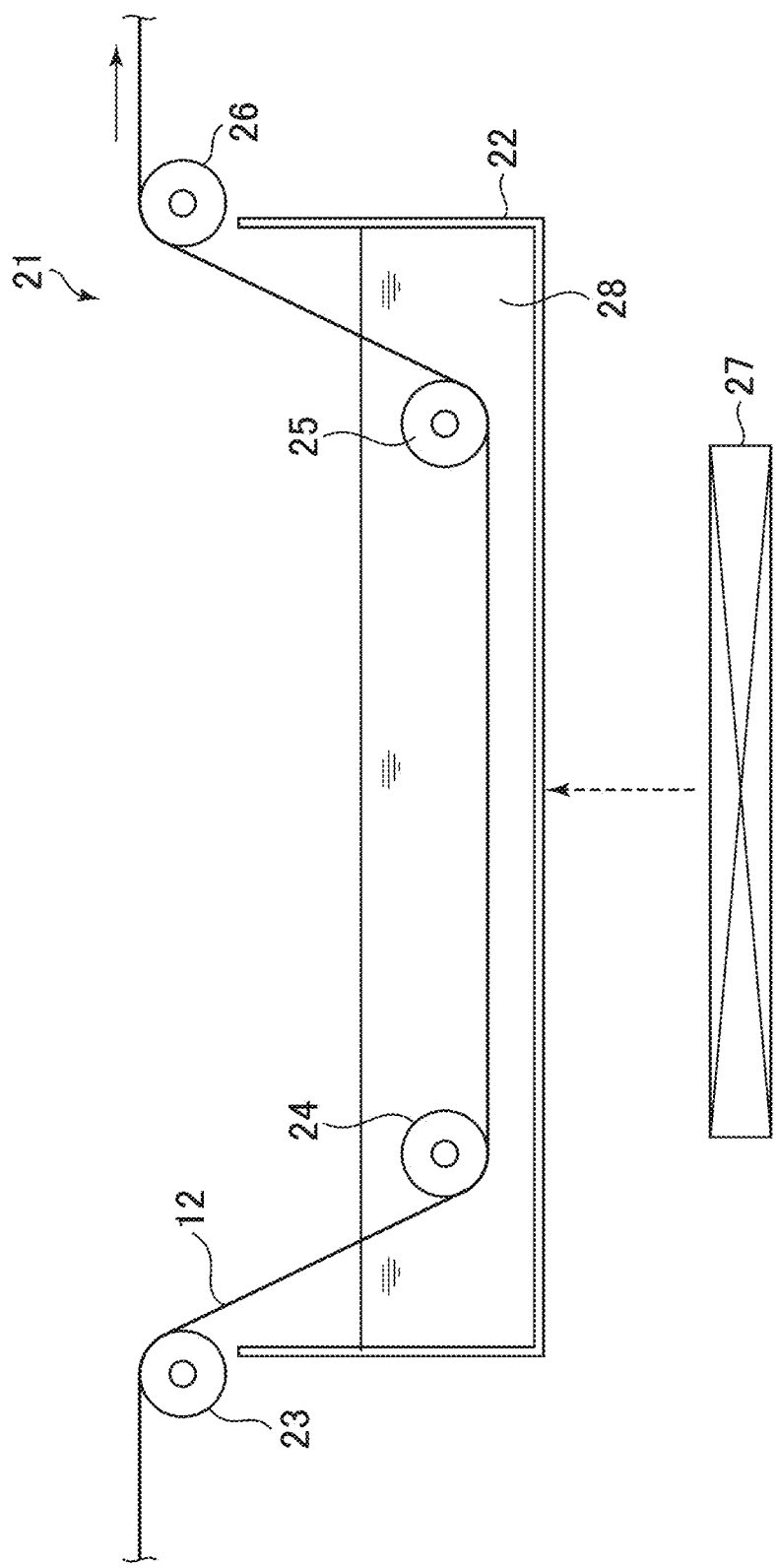
FIG. 9 is an explanatory diagram illustrating a configuration of an adhesion device that causes the CNTs to adhere to a carbon fiber.

As illustrated in FIG. 9, as an example, an adhesion device 21 includes a CNT adhesion tank 22, guide rollers 23 to 26, an ultrasonic wave generator 27, a traveling mechanism (not illustrated) that causes the carbon fiber bundle 12 to travel at a constant speed, and the like. A dispersion 28 is stored in the CNT adhesion tank 22. The ultrasonic wave generator 27 applies ultrasonic waves to the dispersion 28 in the CNT adhesion tank 22 from a lower side of the CNT adhesion tank 22.

The carbon fiber bundle 12 having a long length (for example, approximately 100 m) in which the structure 14 is not formed is continuously supplied to the adhesion device 21. The carbon fiber bundle 12 that is supplied is wound around the guide rollers 23 to 26 in this order, and travels at a constant speed by the traveling mechanism. The carbon fiber bundle 12 in which the sizing agent does not adhere to the carbon fibers 11 is supplied to the adhesion device 21. Note that, the sizing agent stated here is for preventing entanglement of the carbon fibers 11 or the like as described above.

The carbon fiber bundle 12 is wound around the guide rollers 23 to 26 in an opened state. Appropriate tension acts on the carbon fiber bundle 12 wound around the guide rollers 23 to 26, and thus the carbon fibers 11 are less likely to be entangled with each other. It is preferable that the winding of the carbon fiber bundle 12 around the guide rollers 24 to 26 is set to a smaller winding angle (90° or less).

Figure 10:
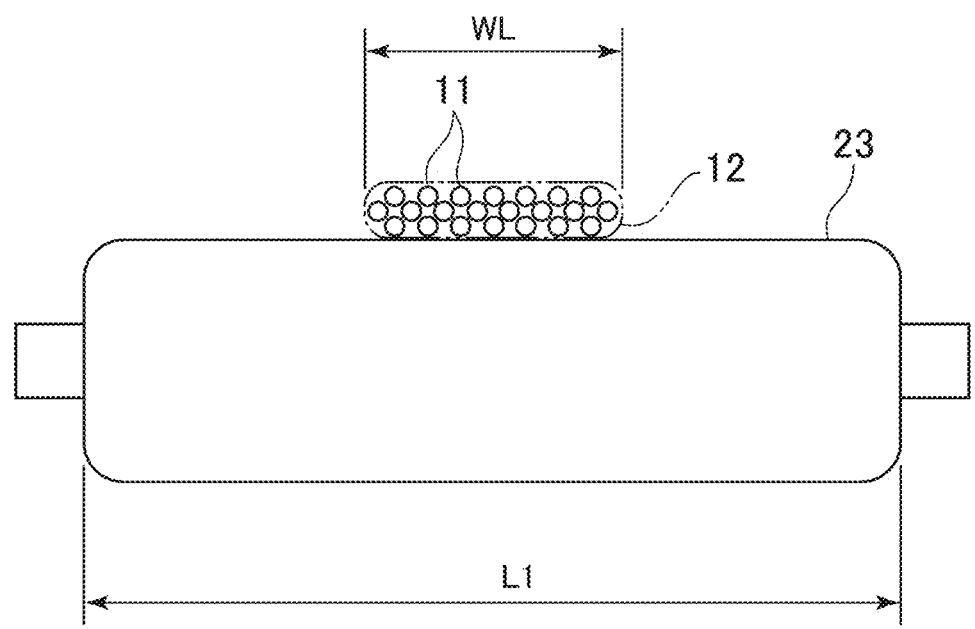
FIG. 10 is an explanatory diagram illustrating a carbon fiber bundle in a state of being opened on a guide roller.

Any of the guide rollers 23 to 26 is a flat roller. As illustrated in FIG. 10, a roller length (a length in an axial direction) L1 of the guide roller 23 is set to be sufficiently larger than a width WL of the carbon fiber bundle 12 that is opened. With regard to the guide rollers 24 to 26, as in the guide roller 23, the roller length is set to be sufficiently larger than the width WL of the opened carbon fiber bundle 12. For example, the guide rollers 23 to 26 have the same size, and the roller length L1 is set to 100 mm, and a diameter (external diameter) of the rollers is set to 50 mm. In the opened carbon fiber bundle 12, a plurality of the carbon fibers 11 are aligned in the thickness direction (a diameter direction of the guide rollers).

Among the guide rollers 23 to 26, the guide rollers 24 and 25 are disposed in the CNT adhesion tank 22. According to this, the carbon fiber bundle 12 linearly travels between the guide rollers 24 and 25 in the dispersion 28 at a constant depth. A traveling speed of the carbon fiber bundle 12 is preferably set within a range of 0.5 to 100 m/minute. The higher the traveling speed of the carbon fiber bundle 12 is, the further productivity is improved. The lower the traveling speed is, the more effective for uniform adhesion of the CNTs 17, and more effective for suppression of entanglement of the carbon fibers 11. In addition, the less entanglement between the carbon fibers 11 is, the further uniformity of adhesion of the CNTs 17 to the carbon fibers 11 is raised. When the traveling speed of the carbon fiber bundle 12 is 100 m/minute or less, entanglement between the carbon fibers 11 is more effectively suppressed, and adhesion uniformity of the CNTs 17 can be further raised. In addition, the traveling speed of the carbon fiber bundle 12 is more preferably set within a range of 5 to 50 m/minute.

The ultrasonic wave generator 27 applies ultrasonic vibration as mechanical energy to the dispersion 28. According to this, in the dispersion 28, a reversible reaction state in which a dispersion state in which the CNTs 17 are dispersed and an aggregation state in which the CNTs 17 are aggregated vary alternately is formed. When the carbon fiber bundle 12 is caused to pass through the dispersion 28 that is in the reversible reaction state, when transitioning from the dispersion state to the aggregation state, the CNTs 17 adhere to the carbon fibers 11 due to Van der Walls force. The mass of the carbon fibers 11 is as large as 100000 or more times the mass of the CNTs 17, energy necessary for detachment of the adhered CNTs 17 is more than energy due to the ultrasonic vibration. According to this, the CNTs 17 adhered once to the carbon fibers 11 in the dispersion 28 are not peeled off from the carbon fibers 11 by the ultrasonic vibration after adhesion. Note that, since the mass is very small, the dispersion state and the aggregation state alternately vary between the CNTs 17 due to the ultrasonic vibration.

When transition from the dispersion state to the aggregation state is repetitively performed, a large number of CNTs 17 adhere to each of the carbon fibers 11, and the structure 14 is formed. As described above, when using the CNTs 17 having a bent shape, other CNTs 17 enter a space formed between the CNTs 17 and the surfaces of the carbon fibers 11 to which the CNTs adhere, between the adhered CNTs 17, or the like, and thus more CNTs 17 adhere to the carbon fibers 11 and the structure 14 is formed.

A frequency of the ultrasonic vibration applied to the dispersion 28 is preferably 40 to 950 kHz. When the frequency is 40 kHz or higher, entanglement between the carbon fibers 11 in the carbon fiber bundle 12 is suppressed. In addition, when the frequency is 950 kHz or lower, the CNTs 17 adhere to the carbon fibers 11 in a satisfactory manner. In order to further reduce entanglement of the carbon fibers 11, the frequency of the ultrasonic vibration is preferably 100 kHz or higher.

In addition, the present inventors found that with regard to the number of the CNTs 17 adhered to the carbon fibers 11, when the number of times of transition from the dispersion state to the aggregation state in the CNTs 17 reaches 100000 or more times, entanglement of the carbon fibers 11 is satisfactorily suppressed, and uniformity of the thickness of the structure 14 can be secured. Note that, the maximum value of the number of the CNTs 17 adhered varies in accordance with a CNT concentration of the dispersion 28, and increases as the CNT concentration of the dispersion 28 is higher. However, when the CNT concentration of the dispersion 28 becomes a high concentration at which the CNTs 17 cannot take a dispersion state when applying the ultrasonic vibration, adhesion of the CNTs 17 to the carbon fibers 11 cannot be performed.

According to this, it is preferable to determine the traveling speed of the carbon fiber bundle 12, a traveling distance of the carbon fiber bundle 12 in the dispersion 28 (an interval between the guide rollers 24 and 25), and the frequency of the ultrasonic vibration that is applied to the dispersion 28 so that the length of a period during which the carbon fiber bundle 12 is traveling in the dispersion 28, that is, time (hereinafter, referred to as "immersion time") for which the carbon fiber bundle 12 is traveling between the guide rollers 24 and 25 becomes 100000 or more times a cycle of the ultrasonic vibration applied to the dispersion 28. That is, it is preferable to satisfy "Ts≥100000/fs", where fs (Hz) represents the frequency of the ultrasonic vibration, and Ts (second) represents the immersion times. For example, when the frequency of the ultrasonic vibration is 100 kHz and the distance along which the carbon fiber bundle 12 travels in the dispersion 28 is 0.1 m, the traveling speed of the carbon fiber bundle 12 can be set to 6 m/minute or less. In addition, even in a case where the carbon fiber bundle 12 is immersed in the dispersion 28 in a plurality of times in a division manner, when total immersion time is set to 100000 or more times the cycle of the ultrasonic vibration, the number of the CNTs 17 adhered can be almost the maximum.

Figure 11:
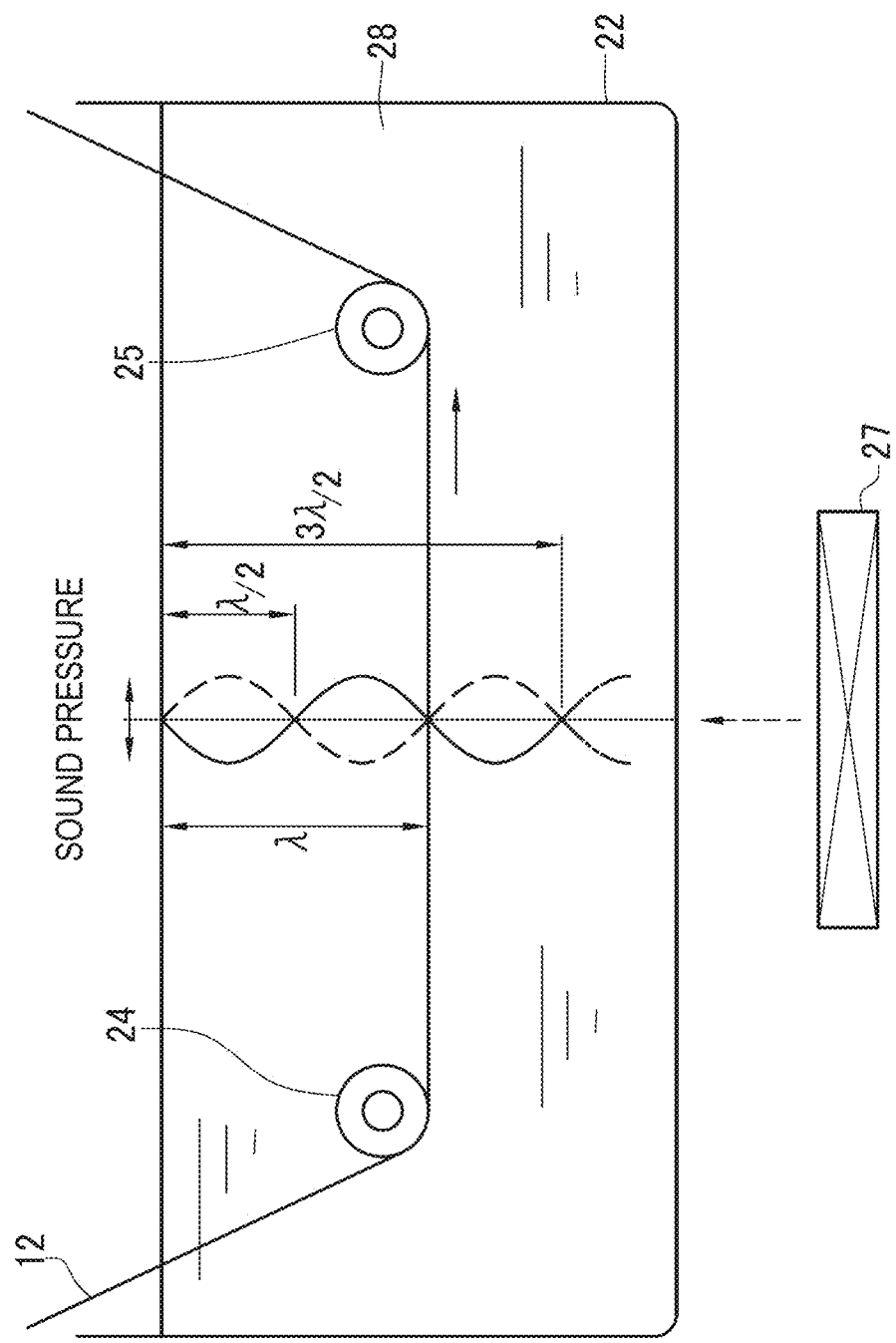
FIG. 11 is an explanatory diagram illustrating a passing position of the carbon fiber in a dispersion.

As schematically illustrated in FIG. 11, a standing wave in which a distribution of a sound pressure (amplitude) is determined occurs in the dispersion 28 inside the CNT adhesion tank 22 due to the ultrasonic vibration applied from the ultrasonic wave generator 27. In the adhesion device 21, positions of the guide rollers 24 and 25 in a depth direction are adjusted so that the carbon fiber bundle 12 travels in the dispersion 28 at a depth at which a standing wave node of the ultrasonic vibration, that is, a sound pressure becomes the minimum. Accordingly, a depth from a liquid surface of the dispersion 28 at which the carbon fiber bundle 12 travels in the dispersion 28 is set as D, a wavelength of a standing wave of ultrasonic vibration that occurs in the dispersion 28 is set as $\lambda$, and n is set as an integer of 1 or more, these values are determined to satisfy a relationship of "D=n·($\lambda$/2)". Note that, the wavelength $\lambda$ of the standing wave can be obtained on the basis of a sound speed in the dispersion 28 and a frequency of the ultrasonic vibration applied from the ultrasonic wave generator 27.

As described above, through adjustment of the depth at which the carbon fiber bundle 12 travels in the dispersion 28, vibration of the carbon fibers 11 due to the sound pressure is suppressed, thread disorder due to thread sagging can be prevented, scraping between the carbon fibers 11 or between the CNTs 14 adhered to surfaces of the carbon fibers 11 can be suppressed, and the structure 14 having a large thickness can be formed. In addition, since scraping can be suppressed, even when the thickness of the structure 14 is large, a variation in CNT mass ratio Rc can be suppressed, and the above-described standard deviation s decreases. Note that, the depth at which the carbon fiber bundle 12 travels in the dispersion 28 may slightly deviate from the standing wave node, and in this case, the depth is preferably set within range (n·$\lambda$/2−$\lambda$/8≤D≤n·$\lambda$/2+$\lambda$/8) that is equal to or larger than n·$\lambda$/2−$\lambda$/8 and equal to or less than n·$\lambda$/2+$\lambda$/8. According to this, it is possible to set the thread disorder of the carbon fibers 11 due to thread sagging in a permissible range.

For example, the dispersion 28 is prepared as follows. A long CNT (hereinafter, referred to as "material CNT") is added to a dispersion medium, the material CNT is cut by a homogenizer, a shearing force, an ultrasonic disperse, or the like to obtain the CNTs 17 having a desired length, and to realize dispersion uniformity of the CNTs 17.

As the dispersion medium, water, alcohols such as ethanol, methanol and isopropyl alcohol, organic solvents such as toluene, acetone, tetrahydrofuran (THF), methyl ethyl ketone (MEK), hexane, normal hexane, ethyl ether, xylene, methyl acetate, and ethyl acetate, and a mixed solution containing these materials in any ratios can be used. The dispersion 28 does not contain a dispersing agent and adhesive.

A material CNT that becomes a source of the CNTs 17 having a bent shape as described above also has a bent shape. In the material CNT, it is preferable that diameters of individual material CNTs are arranged. With regard to the material CNT, even when a length of each CNT generated from cutting is long, it is preferable that the CNT can be isolated and dispersed. According to this, the dispersion 28 in which the CNTs 17 satisfying the above-described length condition are isolated and dispersed is easily obtained.

In the composite material 10 in this example, as described above, since CNTs having the bent shape are caused to adhere as the CNTs 17, other CNT 17 enters a space formed between the CNTs 17 and the surfaces of the carbon fibers 11 to which the CNTs 17 adhere, between the adhered CNTs 17, or the like. According to this, more CNTs 17 adhere to the carbon fibers 11. In addition, the CNTs 17 strongly adhere to the carbon fibers 11 and the structure 14 is formed, and thus the CNTs 17 are less likely to be peeled off from the carbon fibers 11. In addition, in the rotary member 2 manufactured by using the composite material 10, the properties derived from the CNTs are further enhanced.

A concentration of the CNTs 17 in the dispersion 28 is preferably in a range of 0.003 wt % to 3 wt %. The concentration of the CNTs 17 in the dispersion 28 is more preferably 0.005 wt % to 0.5 wt %.

The carbon fiber bundle 12 is dried after being pulled out from the dispersion 28. The first sizing treatment is performed on the dried carbon fiber bundle 12 to apply the first sizing agent 15 to the structure 14.

In the first sizing treatment process ST2, a first sizing treatment is performed. The first sizing treatment includes a process of applying a first sizing treatment solution to (bringing the first sizing treatment solution into contact with) the dried carbon fiber bundle 12, and a drying process. The first sizing treatment solution can be prepared by dissolving the above-described carbodiimide compound in a solvent. As the solvent that dissolves the carbodiimide compound, water, alcohol, ketones, a mixture thereof, and the like can be used.

In the application of the first sizing treatment solution, any method such as a method of immersing the carbon fiber bundle 12 in a liquid tank accommodating the first sizing treatment solution, a method of spraying the first sizing treatment solution to the carbon fiber bundle 12, and a method of coating the first sizing treatment solution to the carbon fiber bundle 12 may be used. The first sizing treatment solution enters a state of being applied to the surface of the CNTs 17 in a state of maintaining direct contact between the CNTs 17. The lower the viscosity of the first sizing treatment solution, the easier it is to aggregate in the vicinity of a contact portion between the CNTs 17 and in the vicinity of a contact portion between the carbon fiber 11 and the CNTs 17.

In the first sizing treatment process ST2, it is possible to set a desired sizing agent mass ratio Rm by adjusting the amount of the first sizing treatment solution applied to the carbon fiber bundle 12, a concentration of a carbodiimide compound in the first sizing treatment solution, and the like.

In the drying after application of the first sizing treatment solution, the solvent (water in this example) of the first sizing treatment solution is caused to evaporate. As a drying method, a known method such as a method in which the carbon fiber bundle 12 to which the first sizing treatment solution is applied is left as is and dried, a method of blowing a gas such as the air to the carbon fiber bundle 12, and a method of heating the carbon fiber bundle 12 can be used, and heating may be used in combination with any of the method of drying the carbon fiber bundle 12 while being left as is and the method of blowing the gas.

Figure 12:
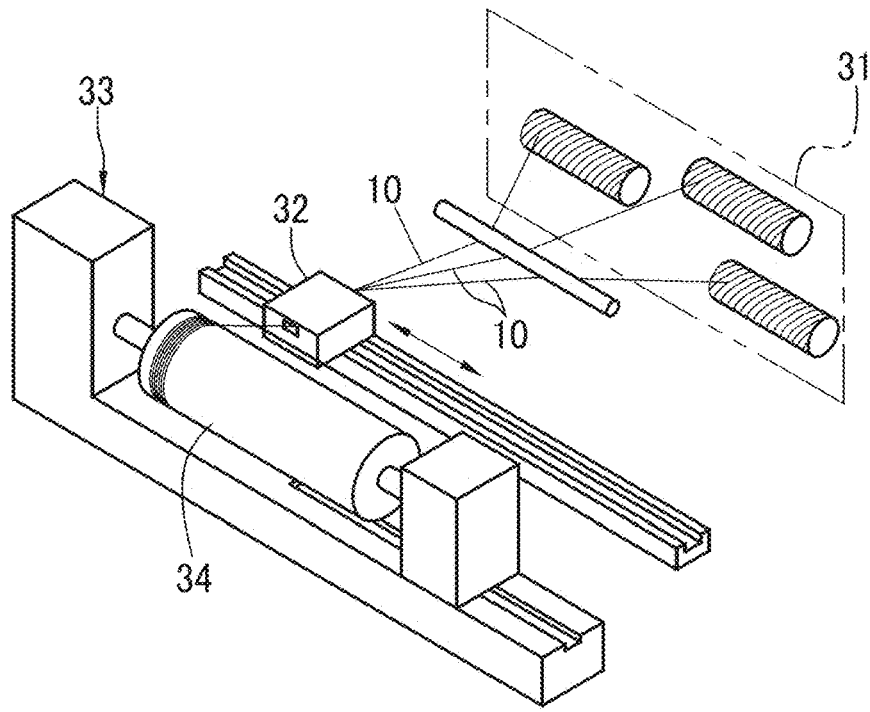
FIG. 12 is a perspective view illustrating an example of a filament winder.

In the molding process ST3, the rotary member 2 is formed by a filament winding method by using the composite material 10 that has undergone the first sizing treatment process ST2. As an example illustrated in FIG. 12, for example, a plurality of the composite materials 10 are delivered from a creel (a yarn feeder) 31 while being adjusted to a predetermined tension, and the delivered composite materials 10 are fed to a filament winder 33 through a resin applicator 32. When the composite materials 10 pass the resin applicator 32, an uncured liquid matrix resin M is applied to surfaces of the CNT composite fibers. At this time, the resin applicator 32 impregnates the structure 14 formed on the surfaces of the carbon fibers 11 with the matrix resin M.

A mandrel 34 is set to the filament winder 33 in a rotatable manner. When the mandrel 34 is rotated by the filament winder 33, the composite materials 10 to which the matrix resin M is applied is wound around the mandrel 34 while a predetermined tension is applied to the composite materials 10. A winding position of the composite materials 10 around the mandrel 34 is determined by a head (not illustrated) provided in the resin applicator 32. The resin applicator 32 reciprocates in an axial direction of the mandrel 34 in synchronization with the rotation of the mandrel 34, and thus the composite materials 10 are wound while shifting the winding position of the composite materials 10 around the mandrel 34 in the axial direction of the mandrel 34.

At this time, when a winding angle (oblique angle) of the composite materials 10 with respect to the axial direction of the mandrel 34 is adjusted, for example, to approximately 90°, the CNT composite fibers to which the matrix resin M is applied can be hoop-wound around the mandrel 34, that is, the CNT composite fibers can be densely wound on an outer circumferential surface of the mandrel 34 in a direction that is approximately perpendicular to an axial center of the mandrel 34. In addition, when the winding angle of the composite materials 10 with respect to the axial direction of the mandrel 34 is adjusted to an angle smaller than 90°, for example, 45°, the CNT composite fibers to which the matrix resin M is applied can be helically wound around the mandrel 34, that is, the CNT composite fibers can be densely wound on the outer circumferential surface of the mandrel 34 at an angle of 45° with respect to the axial center of the mandrel 34.

After forming a molded article in which the composite materials 10 are wound in a predetermined number of layers (one or more layers) on the outer circumferential surface of the mandrel 34 as described above, the mandrel 34 is removed in combination with the molded article from the filament winder 33. For example, the molded article is heated in combination with the removed mandrel 34, and the matrix resin M applied to the CNT composite fibers is cured. The molded article in which the matrix resin M is cured is removed from the mandrel 34, and is cut in a desired width (length in an axial direction) as necessary to obtain the rotary member 2.

Figure 13:
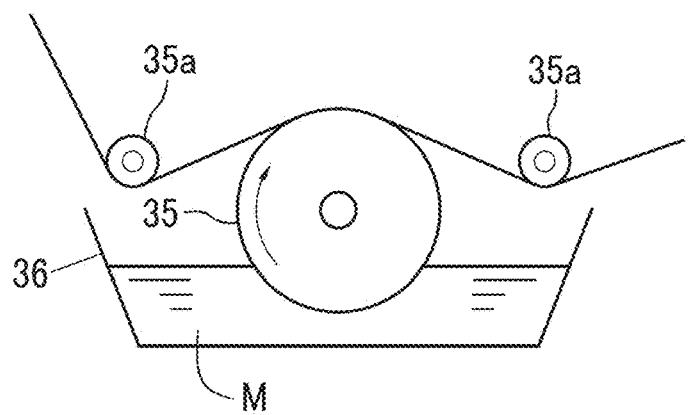
FIG. 13 is an explanatory diagram illustrating an example of a resin application device.

For example, as the resin applicator 32, as illustrated in FIG. 13, a touch roll type resin applicator is used. In the resin applicator 32, a lower part of the touch roll 35 is immersed in the uncured liquid matrix resin M stored in a storage tank 36, and the composite material 10 is pressed against an upper outer circumferential surface of the touch roll 35 by a pair of guide rollers 35a. When the touch roll 35 rotates, the stored liquid matrix resin M is applied to the CNT composite fibers through an outer circumferential surface of the touch roll 35. The amount of application of the matrix resin M to the composite materials 10, that is, the carbon fibers 11 on which the structure 14 is formed is adjusted, and impregnation with the matrix resin M applied to the structure 14 becomes sufficient by adjusting a rotation speed of the touch roll 35, a pressing force of the composite materials 10 against the touch roll 35 by the pair of guide rollers 35a, and the like.

As the matrix resin M, various thermosetting resins or thermoplastic resins can be used without particular limitation. Examples of the thermosetting resins include an epoxy resin, a phenol resin, a melamine resin, a urea resin, unsaturated polyester, an alkyd resin, thermosetting polyimide, a cyanate ester resin, a bismaleimide resin, a vinyl ester resin, and the like, and may be a mixture of the resins. In addition, examples of the thermoplastic resins include general-purpose resins such as polyethylene, polypropylene, polyvinyl chloride, polystyrene, an acrylonitrile/styrene (AS) resin, an acrylonitrile/butadiene/styrene (ABS) resin, a methacrylic resin (PMMA or the like), and a thermoplastic epoxy resin, engineering plastics such as polyamide, polyacetal, polyethylene terephthalate, ultrahigh molecular weight polyethylene, polycarbonate, and a phenoxy resin, and super engineering plastics such as polyphenylene sulfide, polyether ether ketone, polyether ketone ketone, liquid crystal polymer, polytetrafluoroethylene, polyetherimide, polyarylate, and polyimide.

It has been confirmed that the tensile strength of the rotary member 2 and a fiber volume content (Vf) of the carbon fibers 11 have a positive correlation, and it is preferable that the fiber volume content (Vf) of the carbon fibers 11 is higher from the viewpoint of increasing the tensile strength. The fiber volume content of the carbon fibers 11 may be, for example, 75% or more or less than 75%. On the other hand, the fiber volume content is preferably set to less than 75% from the viewpoint of brittleness resistance of the rotary member 2. In addition, the fiber volume content of the carbon fibers 11 is preferably set to 50% or more from the viewpoint of easiness of molding at the time of manufacturing the rotary member 2. From these viewpoints, as a preferred aspect, the fiber volume content of the rotary member 2 is set to 50% or more and less than 75%. Note that, the fiber volume content of the carbon fibers 11 in the rotary member 2 can be changed by adjusting, for example, the amount of application of the matrix resin M to the composite materials 10 by the resin applicator 32, or the tension of the composite materials 10 when being wound around the mandrel 34.

Note that, the fiber volume content of the carbon fibers 11 in the rotary member 2 can be obtained as follows, for example, by using Expression (3). In Expression (3), a value ρ represents a specific gravity of the rotary member 2, a value $\rho_f$ represents a specific gravity of the carbon fibers 11, and a value $\rho_m$ represents a specific gravity of the matrix resin M. As the specific gravity ρ of the rotary member 2 and the specific gravity pm of the matrix resin M, values measured by a measuring device (for example, a high-precision electronic gravimeter SD-200L (manufactured by Alfa Mirage Co., Ltd.)) are used. As the specific gravity $\rho_f$ of the carbon fibers 11, a value measured by a similar measuring device as in the rotary member 2 or the like may be used, or a catalog value (nominal value of a manufacturer of the carbon fibers 11) may be used. Note that, the specific gravity each of the CNTs 17 and the first sizing agent 15 adhered to the carbon fibers 11 is very smaller that the specific gravity of the carbon fibers 11, and thus the specific gravity of the carbon fibers 11 alone may be regarded as the specific gravity $\rho_f$.

[Formula 2]

$$V_f = \frac{\rho - \rho_m}{\rho_f - \rho_m} \quad (3)$$

In the molding process ST3, when curing the matrix resin M of the molded article prepared by winding the composite materials 10 around the mandrel 34, in a case where the matrix resin M is a thermosetting resin such as an epoxy resin, it is preferable to change a heating temperature step by step while raising the degree of accuracy in an inner diameter dimension of the rotary member 2. In an example shown in FIG. 14, the temperature is changed in two stages in a curing process of curing the matrix resin M of the molded article. A temperature is raised from room temperature to a first heating temperature T1 and the first heating temperature T1 is held for a predetermined time, and the temperature is raised to a second heating temperature T2 higher than the first heating temperature T1 and the second heating temperature T2 is held for a predetermined time. After maintaining the second heating temperature T2 for the predetermined time, the molded article is naturally cooled down, and the molded article is removed from the mandrel 34 to obtain the rotary member 2.

A first heating process of heating the molded article at the first heating temperature T1 is a process of causing gelation of the matrix resin M to progress for mainly curing the molded article up to a stable shape with less size variation in a state of suppressing thermal expansion or thermal shrinkage of the mandrel 34 due to heating so as to decrease an error in an inner diameter dimension of the rotary member 2 to be prepared. Accordingly, the first heating temperature T1 is set to a temperature at which the thermal expansion of the mandrel 34 is suppressed to be small. In addition, heating at the first heating temperature T1 is performed until a stable shape of the molded article is obtained, that is, to a certain extent in which it can be said that curing is accomplished even though final strength is not obtained. More specifically, the holding time at the first heating temperature T1 can be determined, for example, as time until a storage modulus of the matrix resin M becomes approximately constant. Note that, in the first heating process, it is preferable to suppress the thermal expansion or the thermal shrinkage of the molded article in order to further reduce the error in the inner diameter dimension of the rotary member 2. In this case, the first heating temperature T1 is a temperature at which the thermal expansion or the thermal shrinkage of the mandrel 34 is suppressed to be small, and is set to a temperature equal to or lower than a glass transition point of the matrix resin M (a constant temperature equal to or lower than the glass transition point of the matrix resin M which increases during the first heating process) at the time of termination of the first heating process so as to suppress the thermal expansion or the thermal shrinkage of the molded article. The same is true of this example.

The holding time at the first heating temperature T1 may be time until a variation rate (increase rate) of the storage modulus of the matrix resin M turns to a decrease, time until a loss modulus reaches a peak or peaks out, or the like. Note that, for example, a variation in the storage modulus and the loss modulus of the matrix resin M with respect to the heating time for every heating temperature can be known by using a rheometer, and the holding time at the first heating temperature T1 can be determined in advance. In addition, the glass transition point of the matrix resin M can be known in advance.

In a second heating process of heating the molded article at the second heating temperature T2, the molded article is heated at the second heating temperature T2 higher than the first heating temperature T1 in order to cause curing of the matrix resin M that has undergone the first heating process to progress, thereby obtaining final strength, elastic modulus, and heat resistance of the rotary member 2. In a case where the matrix resin M is a cyanate ester resin, for example, the first heating temperature T1 is preferably within a range of 100° C. to 200° C., and the second heating temperature T2 is preferably within a range of 200° C. to 300° C.

When the heating temperature is changed step by step as described above, in the first heating process, the molded article is heated at the first heating temperature T1, and the matrix resin M is cured. Accordingly, a stable shape of the molded article is formed. In the subsequent second heating process, curing of the matrix resin M of the molded article progresses, and the molded article has final strength, elastic modulus, and heat resistance. The inner diameter dimension of the rotary member 2 prepared as described above is approximately determined at a point of time at which the stable shape of the molded article is formed in the first heating process, and since heating is performed at the first heating temperature T1 in the first heating process, the thermal expansion of the mandrel 34 and the thermal expansion or the thermal shrinkage of the matrix resin M are small. According to this, a molded article, that is, the rotary member 2 with a small error in the inner diameter dimension is obtained.

Note that, when the molded article is heated at the second heating temperature T2 in the second heating process, the thermal expansion of the mandrel 34 is larger in comparison to the first heating process, and the molded article having a stable shape is deformed due to the thermal expansion, but the majority of the deformation is an elastic deformation and thus the deformation returns to the original state after cooling. According to this, in the second heating process, an influence by the inner diameter dimension of the molded article is significantly small.

When preparing 50 pieces of the rotary members 2 by changing the heating temperature step by step and by actually using a carbon steel material S45C for machine structural use as a material of the mandrel 34, the inner diameter dimension was 40 mm±0.003 mm. In contrast, when preparing 50 pieces of the rotary members 2 by raising a temperature from room temperature to the second heating temperature T2 in combination with the mandrel 34 prepared by the same material, the inner diameter dimension was 40 mm±0.01 mm or more. Note that, in the former case, a temperature was raised from room temperature and the first heating temperature T1 was held for 90 minutes, and then a temperature was raised from the first heating temperature T1 and the second heating temperature T2 was held for 120 minutes. In the latter case, a temperature was raised from room temperature to the second heating temperature T2, and the second heating temperature T2 was held for 210 minutes. The first heating temperature T1 in the former case was set to 145° C., and the second heating temperature T2 in the former case and the latter case was set to 200° C. Accordingly, it can be seen that when curing the matrix resin M of the molded article by changing the heating temperature step by step as described above, control of the inner diameter dimension of the rotary member 2 to be prepared becomes easy, and thus it is possible to prepare the rotary member 2 in which an error in a desired inner diameter dimension is suppressed. Note that, this method can be used in a case of preparing a rotary member in a filament winding method regardless of presence or absence of the structure 14, the first sizing agent 15, and the like. Note that, the heating temperature in the first heating process may be changed step by step in two or more steps, and heating may be performed for a predetermined time for every heating temperature.

Figure 15:
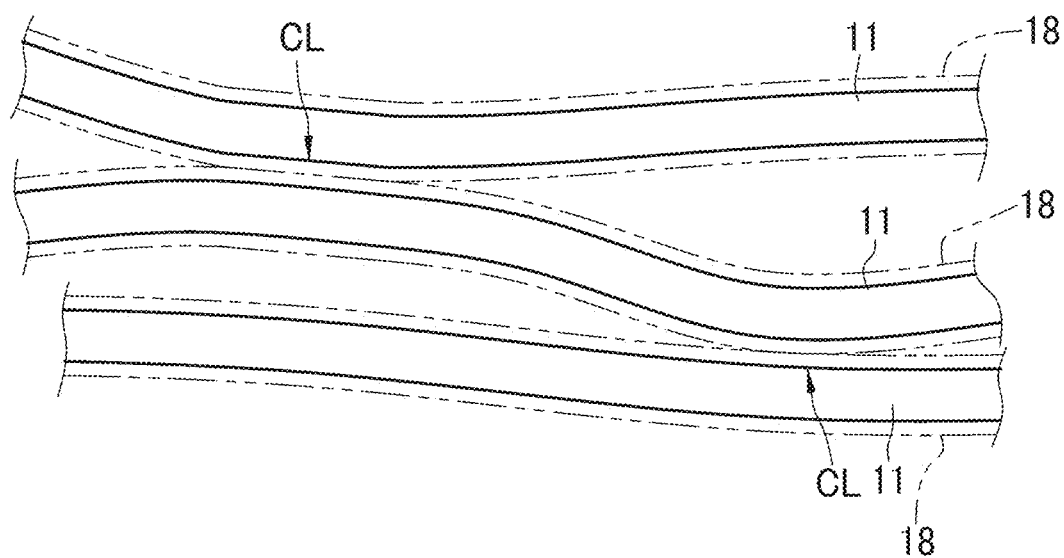
FIG. 15 is an explanatory diagram illustrating a state in which carbon fibers are cross-linked to each other.

In the rotary member 2 using the above-described composite material 10, as schematically illustrated in FIG. 15, due to a cross-linking portion CL in which parts of the composite region 18 between the carbon fibers 11 are fixed to each other, a cross-linking structure in which the carbon fibers 11 are cross-linked is provided. As described above, the composite region 18 is a region formed from the structure 14 and the matrix resin M that is impregnated into the structure 14 and is cured. The composite region 18 has higher hardness in comparison to a cured matrix resin alone, and has high elasticity, that is, a large elastic limit. In addition, the composite region 18 has higher wear resistance in comparison to the matrix resin. Due to mutual bonding of a plurality of the composite regions 18, bonding between the carbon fibers 11 becomes strong, and the tensile strength of the rotary member 2 using the composite material 10 is improved.

Since the cross-linking structure is formed in a case where a distance between the carbon fibers 11 is short to a certain extent in which a plurality of the structures 14 come into contact with each other, the larger the thickness of the structure 14 is, the more advantageous because the more cross-links occur. However, the thickness of the structure 14 is preferably set to at most 300 nm or less from the viewpoint of securing quality stability by a uniform thickness, the viewpoint of preventing detachment from the carbon fibers 11, and the like. Particularly, the thickness of the structure 14 may be set within a range of 50 nm to 200 nm.

In addition, in the structure 14, since the plurality of CNTs 17 are entangled with each other in a non-woven fabric shape with a certain thickness, the matrix resin M applied to the carbon fibers 11 is maintained in a state of being impregnated into the structure 14. Accordingly, in the carbon fiber-reinforced molded article such as the rotary member 2, the matrix resin M substantially does not deviate on the surfaces of the carbon fibers 11 regardless of a molding method thereof, and an interval between the carbon fibers becomes uniform. Therefore, a load is uniformly transferred between the carbon fibers through a shear force of the matrix resin M, and thus tensile strength of the rotary member 2 effectively increases.

Figure 16:
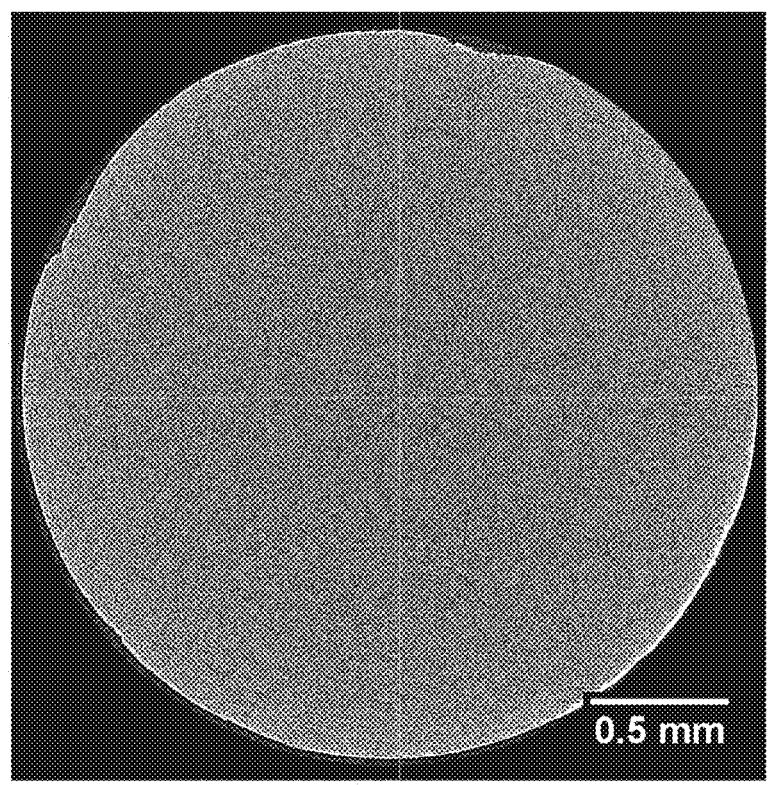
FIG. 16 is an image showing an internal structure of a rod using a composite material which is obtained by X-ray CT.
Figure 17:
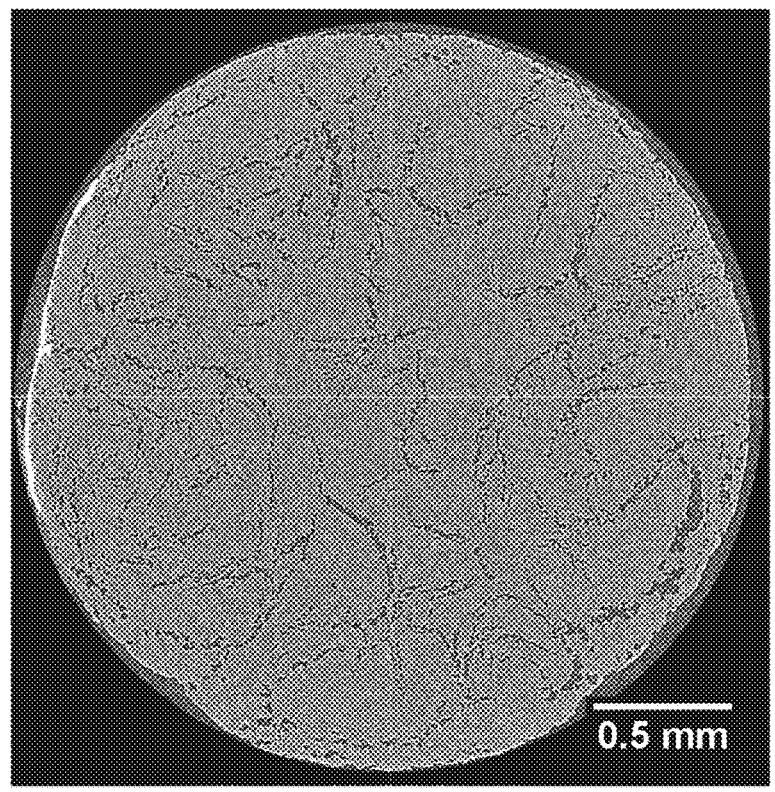
FIG. 17 is an image showing an internal structure of a rod using a raw fiber of the carbon fiber which is obtained by X-ray CT.

FIG. 16 shows an image of an internal structure of a cylindrical rod prepared as the carbon fiber-reinforced molded article by a drawing molding method by using the composite material 10, and the image is obtained by X-ray CT. In the rod prepared by using the composite material 10, it can be confirmed that large deviation of the matrix resin M and voids do not exist, and a distance between the carbon fibers is approximately uniform over the entirety of the rod. In contrast, in an internal structure of a rod prepared by using carbon fibers (raw fiber) to which the CNTs do not adhere, as shown in FIG. 17, it was confirmed that large deviation of the matrix resin M and voids occur.

Figure 18:
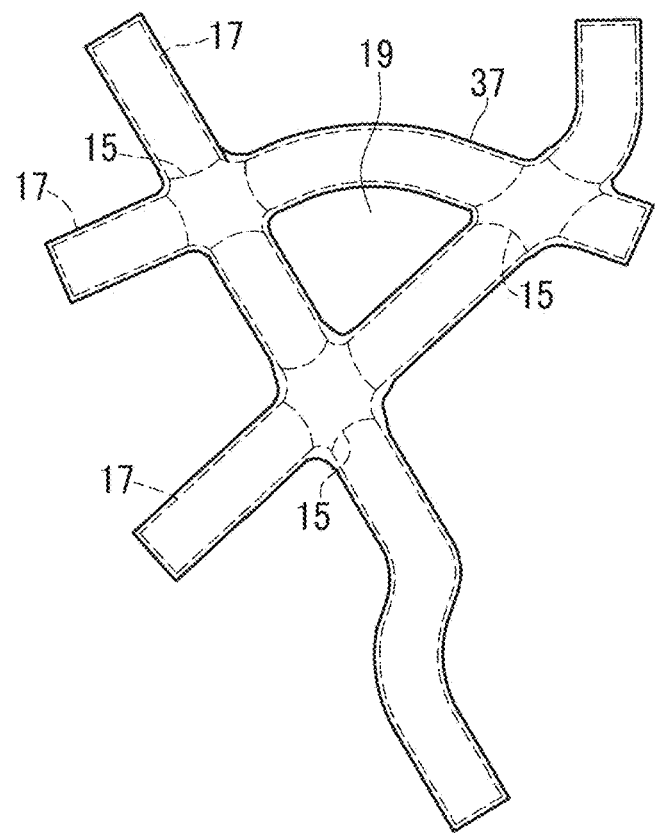
FIG. 18 is an explanatory diagram illustrating an adhesion state of a second sizing agent to the CNTs.

A second sizing agent as a covering agent that covers a surface of CNTs of the structure may be applied to the composite material in addition to the first sizing agent having the carbodiimide-derived structure. As illustrated in FIG. 18, a second sizing agent 37 adheres to the CNTs 17 to cover the surfaces of the CNTs 17 of the structure 14. The second sizing agent 37 is composed of a cured product or a non-cured product of a reactive curing resin, a thermosetting resin, or a thermoplastic resin.

The second sizing agent 37 is applied to the composite material 10 by a second sizing treatment after the first sizing treatment of applying the first sizing agent 15. The second sizing treatment can be performed by a typical method. The carbon fiber bundle 12 (carbon fibers 11) opened after the first sizing treatment is brought into contact with a second sizing treatment solution obtained by dissolving a resin (polymer) serving as the second sizing agent 37 in a dispersion medium so as to apply the second sizing agent 37 to the carbon fiber bundle 12, and then the dispersion medium is caused to evaporate and the second sizing agent 37 is cured or semi-cured. Note that, an emulsion type second sizing treatment solution including a liquid droplet-shaped resin serving as the second sizing agent can also be used.

The resin serving as the second sizing agent 37 is not particularly limited, and various reactive curing resins, thermoplastic resins, thermosetting resins, and the like can be used. Examples of the thermosetting resins include an epoxy resin, a phenolic resin, a melamine resin, a urea resin, unsaturated polyester, an alkyd resin, thermosetting polyimide, a cyanate ester resin, a resin having a reactive group, and the like. In addition, examples of the thermoplastic resins include general-purpose resins such as polyethylene, polypropylene, polystyrene, an acrylonitrile/styrene (AS) resin, an acrylonitrile/butadiene/styrene (ABS) resin, a methacrylic resin (PMMA, or the like), vinyl chloride, and a thermoplastic epoxy resin, engineering plastics such as polyamide, polyacetal, polyethylene terephthalate, ultrahigh molecular weight polyethylene, and polycarbonate, and super engineering plastics such as polyphenylene sulfide, polyether ether ketone, a liquid crystal polymer, polytetrafluoroethylene, polyetherimide, polyarylate, and polyimide.

The second sizing agent 37 covers the surfaces of the CNTs 17 including the first sizing agent 15. In the second sizing agent 37, a portion of the first sizing agent 15 is cross-linked to the first sizing agent 15, but cross-linking does not occur at a portion where the first sizing agent 15 does not exist, and thus viscosity is provided. Due to the second sizing agent 37, a bundling property of a fiber bundle including the plurality of carbon fibers 11 in which the structure 14 is formed is improved. It is preferable that the second sizing agent 37 does not fill up the gap 19 of the structure 14 as in the first sizing agent 15.

Description has been given of the rotary member that is used in a surface magnet type electric motor, but the rotary member is not limited thereto. For example, the rotary member may be a rotary member such as a member that is fitted around a rotor of a generator having a similar structure as in the surface magnet type electric motor, and a rotary body that is used in a centrifugal separator. In addition, a structure in which another member is integrally formed or assembled on an inner circumference or an outer circumference of the rotary member having a cylindrical shape, a ring shape, or the like may be employed. Accordingly, a carbon fiber-reinforced layer that becomes a rotary member may be formed as a part of a member including another member.

EXAMPLES

Example 1

Figure 19:
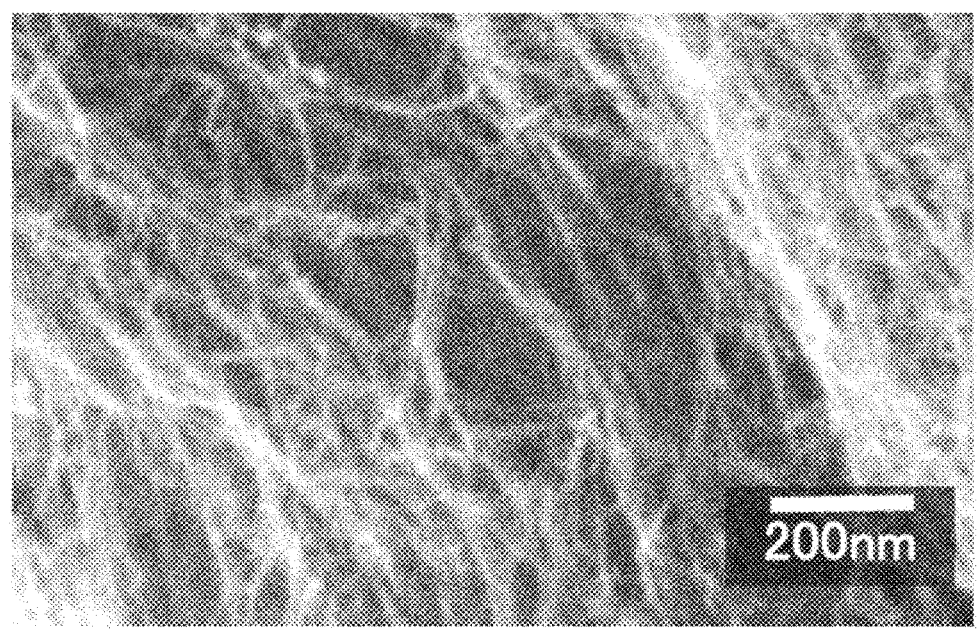
FIG. 19 is a SEM photograph showing a bent state of a material CNT used in Example.

In Example 1, the composite material 10 was prepared by the above-described steps, a peeling test of the CNTs 17 was performed, and the effect of the first sizing agent 15 was confirmed. The dispersion 28 used when preparing the composite material 10 was prepared by the material CNT having the bent shape as described above. A SEM photograph of the material CNT used in preparation of the dispersion 28 is shown in FIG. 19. The material CNT was formed in a multi-layer structure, and a diameter was within a range of 3 nm to 10 nm. The material CNT was cleaned with 3:1 mixed acid of sulfuric acid and nitric acid to remove a catalytic residue, and was filtered and dried. The material CNT was added to acetone as the dispersion medium of the dispersion 28, and the material CNT was cut by using an ultrasonic homogenizer to obtain the CNTs 17. A length of the CNTs 17 in the dispersion 28 was 0.2 pm to 5 pm. In addition, the CNTs 17 in the dispersion 28 could be evaluated as having the bent shape. A concentration of the CNTs 17 in the dispersion 28 was set to 0.12 wt % (=1200 wt ppm). A dispersing agent and an adhesive were not added to the dispersion 28.

As the carbon fiber bundle 12, TORAYCA (registered trademark) T700SC-12000 (manufactured by TORAY INDUSTRIES, INC.) was used. The carbon fiber bundle 12 includes 12000 carbon fibers 11. A diameter of the carbon fibers 11 is approximately 7 pm, and a length thereof is approximately 500 m. Note that, in the carbon fiber bundle 12, the sizing agent for preventing entanglement of the carbon fibers 11 was removed from the surfaces of the carbon fibers 11 before adhesion of the CNTs 17.

In a state of being opened, the carbon fiber bundle 12 was wound around the guide rollers 23 to 26 and was traveled in the dispersion 28 contained in the CNT adhesion tank 22. A traveling speed of the carbon fiber bundle 12 was set to 1 m/minute, and ultrasonic vibration having a frequency of 200 kHz was applied to the dispersion 28 with the ultrasonic wave generator 27. Note that, immersion time for which the carbon fiber bundle 12 travels between the guide rollers 24 and 25 was set to 6.25 seconds. The immersion time corresponds to 1250000 cycles of the ultrasonic vibration applied to the dispersion 28. In the dispersion 28, the carbon fiber bundle 12 was caused to travel at a depth D from a liquid surface of the dispersion 28 satisfying a relationship of "$D = n \cdot (\lambda/2)$".

After the carbon fiber bundle 12 pulled out from the dispersion 28 was dried, the first sizing treatment was performed to apply the first sizing agent 15 to the CNTs 17 constituting the structure 14. In the first sizing treatment, a first sizing treatment solution obtained by dissolving "Carbodilite V-02" (trade name, manufactured by Nisshinbo Chemical Inc.) as a carbodiimide compound in water was used. A concentration of the carbodiimide compound in the first sizing treatment solution was adjusted so that a mass ratio Rm of a sizing agent becomes 1.0%. The carbon fiber bundle 12 that has undergone the first sizing treatment was dried to obtain the composite material 10.

It was observed that a plurality of CNTs 17 uniformly disperse and adhere to a plurality of carbon fibers 11 (hereinafter, referred to as "sample fibers") obtained by cutting a part of the carbon fiber bundle 12 that has undergone the first sizing treatment as described above with a SEM. As a result, it was confirmed that the CNTs 17 uniformly adhered even a narrow range (locally) and in a wide range in a fiber axis direction of the carbon fibers 11, and thus the structure 14 was formed. In addition, it was confirmed that the structure 14 was formed in a non-woven fabric shape having a three-dimensional mesh structure constituted by a plurality of the CNTs 17, that is, the gap 19, and the majority of the gap 19 was not filled up by the first sizing agent 15.

In the peeling test of the CNTs 17, the sample fibers were immersed in a mixed solution obtained by mixing water and a surfactant with each other, and ultrasonic vibration was applied from an ultrasonic wave generator to the mixed solution for 10 minutes. A length of the carbon fibers 11 immersed in the mixed solution was 1 m, a concentration of the surfactant in the mixed solution was 0.2 mass %, and a frequency of the ultrasonic vibration applied to the mixed solution was 100 kHz.

As Comparative Example 1, the CNT peeling test was performed with respect to carbon fibers obtained by performing the first sizing treatment by using a sizing treatment solution obtained by dissolving an epoxy resin instead of the carbodiimide compound in acetone. In Comparative Example 1, the same conditions were set except that the sizing treatment solution is different. A concentration of the epoxy resin in the sizing treatment solution was adjusted so that a mass ratio Rm of the sizing agent becomes 1.0%.

In the peeling test of Comparative Example 1, it was confirmed that the mixed solution became black and turbid, and 90% or more of CNTs fell off from the carbon fibers through confirmation after the peeling test. In contrast, in the peeling test in Example 1, it could be confirmed that the mixed solution was slightly turbid, and the CNTs 17 hardly fell off from the carbon fibers 11. That is, it could be understood that contact between the CNTs 17, and contact between the CNTs 17 and the carbon fibers 11 become strong due to the first sizing agent 15 having the carbodiimide-derived structure, collapse of the structure 14 and peeling-off of the structure 14 from the carbon fibers 11 are effectively suppressed.

Example 2

In Example 2, a test piece A21 that is a carbon fiber-reinforced molded article was prepared by using a composite material 10 prepared under the same conditions as in Example 1, and a mode I interlayer fracture toughness test was performed. The test piece A21 was prepared to have a length of 160 mm, a width of 23 mm, and a thickness of 3 mm. In Example 2, a prepreg was prepared by using the composite material 10 that has undergone the first sizing treatment. The test piece A21 was prepared by laminating a plurality of sheets of prepregs cut into a rectangular shape (160 mm×23 mm) and by heating the resultant laminated body while pressing the laminated body to cure the matrix resin. Each of the prepregs was cut so that a longitudinal direction matches a fiber axis direction of the carbon fibers 11, and the fiber axis direction of the entirety of the carbon fibers 11 was caused to match a longitudinal direction of the test piece A21.

The mode I interlayer fracture toughness test was performed with respect to the test piece A21 in conformity to JIS K7086 by using an autograph universal testing machine AG5-5kNX (manufactured by SHIMADZU CORPORATION). As a test method, a double cantilever beam interlayer fracture toughness test method (DCB method) was used. That is, an initial crack of 2 mm to 5 mm was formed from the tip of the test piece A21 with a sharp knife or the like, and the crack was caused to further progress, and the test was terminated at the point of time when a crack progression length from the tip of the initial crack reached 60 mm. A crosshead speed of the test machine was changed in correspondence with the amount of crack progression. Specifically, the crosshead speed was set to 0.5 mm/minute until the amount of crack progression reached 20 mm. When the amount of crack progression exceeded 20 mm, the crosshead speed was set to 1 mm/minute. The crack progression length was measured on both side surfaces of the test piece A21 by using a microscope, and a load and a crack opening displacement were measured to obtain the mode I interlayer fracture toughness value (GIC) from a load-crack opening displacement (COD) curve.

As Comparative Example 2, a composite material obtained by performing the first sizing treatment obtained by using a sizing treatment solution obtained by dissolving an epoxy resin instead of the carbodiimide compound in acetone was used, and a test piece B21 that is a carbon fiber-reinforced molded article in which the composite material is set as a reinforcement fiber, and a test piece B22 that is a carbon fiber-reinforced molded article in which a carbon fiber (raw fiber) to which CNTs do not adhere is set as a reinforcement fiber were prepared, respectively, and the mode I interlayer fracture toughness test was performed. In the test piece B22, the sizing treatment was not performed. In Comparative Example 2, the other conditions were set to be the same as in the test piece A21.

The mode I interlayer fracture toughness strength GIR of a mode I interlayer fracture toughness value (GIC) when the amount of crack progression is 20 mm was 0.425 kJ/m$^2$ in the test piece A21 of Example 2, 0.323 kJ/m$^2$ in the test piece B21 of Comparative Example 2, and 0.231 kJ/m$^2$ in the test piece B22 of Comparative Example 2. From the results, it can be seen that the mode I interlayer fracture toughness strength GIR of test piece (carbon fiber-reinforced molded article) A21 of Example 2 was improved approximately 1.32 times in comparison to the test piece B21 of Comparative Example 2 and approximately 1.84 times in comparison to the test piece B22 of Comparative Example 2.

Example 3

In Example 3, solid rods A31 and A32 which are carbon fiber-reinforced molded articles in which a composite material 10 prepared in a similar manner as in Example 1 was set as a reinforcement fiber were prepared, and a three-point bending test was performed with respect to the rods A31 and A32. In Example 3, a cylindrical molded article having a diameter of approximately 2.6 mm was prepared directly from the composite material 10 and a matrix resin by a drawing molding method, centerless polishing was performed with respect to the molded article, and the rods A31 and A32 having a diameter of approximately 2.2 mm and a cross-section close to a perfect circle were prepared. Accordingly, in the rods A31 and A32, an axial direction and the fiber axis direction of the carbon fibers 11 match each other. Note that, TORAYCA T700SC (manufactured by TORAY INDUSTRIES, INC.) was used as the carbon fibers 11 (raw fiber) of the rod A31, and TORAYCA T800SC (manufactured by TORAY INDUSTRIES, INC.) was used as the carbon fibers 11 (raw fiber) of the rod A32. The other preparation conditions of the rods A31 and A32 were set to be the same as in Example 1.

Each of the rods A31 and A32 was cut to prepare a plurality of test pieces having a length of 120 mm, and a three-point bending test was performed with respect to the test pieces in conformity to JIS K 7074:1988 "Testing methods for flexural properties of carbon fiber reinforced plastics". A distance between support points was set to 80 mm. With regard to the three-point bending test, a test in which a lowering speed of the indenter is set to be relatively low (hereinafter, referred to as "low-speed bending test") and a test in which the lowering speed is set to be relatively high (hereinafter, referred to as "high-speed bending test") were performed to obtain a fracture load (N), respectively. In the low-speed bending test, the lowering speed of the indenter was set to 5 mm/second, and in the high-speed bending test, the lowering speed of the indenter was set to two kinds of 1 m/second and 5 m/second. As the fracture load (N), a 60% conversion value of a fiber volume content (Vf) was obtained with respect to respective results of the low-speed bending test and the two kinds of high-speed bending tests. Note that, with respect to each of the rods A31 and A32, in any of the low-speed bending test and the two kinds of high-speed bending tests, a plurality of times of tests were performed by using a plurality of test pieces.

As Comparative Example 3, solid rods B31 and B32 which are carbon fiber-reinforced molded articles in which carbon fibers (raw fiber) to which CNTs do not adhere was set as a reinforcement fiber were prepared, and the three-point bending test was performed with respect to the rods B31 and B32. Carbon fibers of the rod B31 are the same as the carbon fibers of the rod A31, and carbon fibers of the rod B32 are the same as the carbon fibers of the rod A32. The rods B31 and B32 were prepared under the same conditions as in the rods A31 and A32 except that the carbon fibers were used as raw fiber. In addition, the three-point bending test with respect to the rods B31 and B32 was performed under the same conditions as in the rods A31 and A32 to obtain the fracture load (N).

Figure 20:
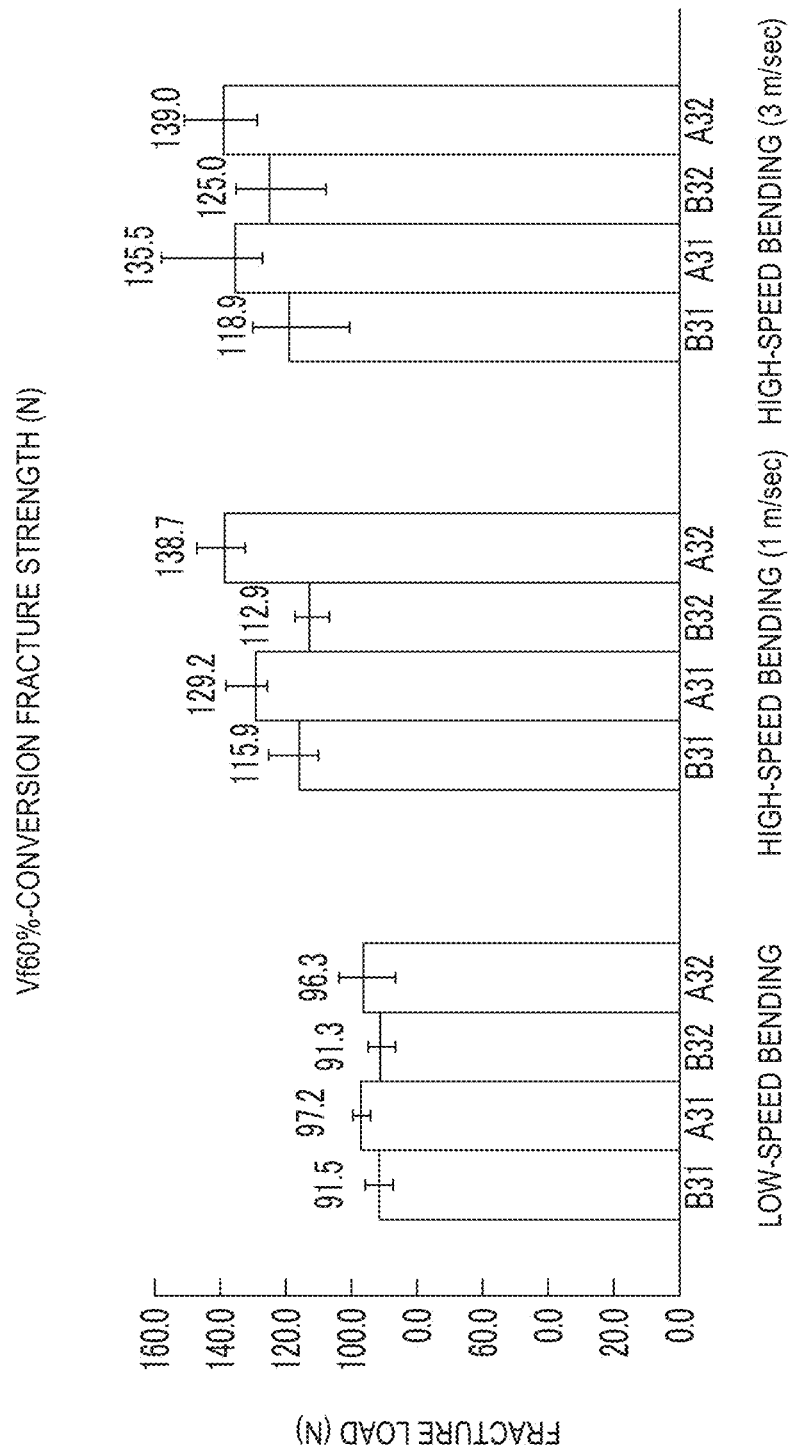
FIG. 20 is a graph showing three-point bending test results of Example 3.

The above-described test results are shown in FIG. 20. In the low-speed bending test, the fracture strength of the rod A31 was further improved in comparison to the rod B31 by 11%, and the fracture strength of the rod A32 was further improved in comparison to the rod B32 by 23%. In addition, in the high-speed bending test, the fracture strength of the rod A31 was further improved in comparison to the rod B31 by 14%, and the fracture strength of the rod A32 was further improved in comparison to the rod B32 by 11%.

Example 4

In Example 4, ring-shaped test pieces A41 and A42 which are carbon fiber-reinforced molded articles using a composite material 10 prepared in a similar manner as in Example 1 were prepared as a rotary member, and an NOL ring test (conforming to ASTM D2290) was performed. That is, tensile strength in a circumferential direction was obtained by using the ring-shaped test pieces A41 and A42 obtained by winding the composite material 10 as a fiber base material in parallel in one direction. As described above, the ring-shaped test pieces A41 and A42 were prepared by using a filament winding method. That is, the composite material 10 (CNT composite fibers) after the first sizing treatment was impregnated with a matrix resin M and was wound around a cylindrical mandrel 34 attached to a filament winder 33, thereby forming a molded article. The molded article was heated in combination with the mandrel 34 to cure the matrix resin M. After curing of the matrix resin M, the molded article from which the mandrel 34 was pulled out was cut in a predetermined width to obtain the ring-shaped test pieces A41 and A42. The matrix resin M was applied to the composite material 10 after the first sizing treatment by using a roll coater. TORAYCA T1100 (manufactured by TORAY INDUSTRIES, INC.) was used as the carbon fibers 11 (raw fiber). The other preparing conditions of the composite material 10 were set to be the same as in Example 1.

Figure 21:
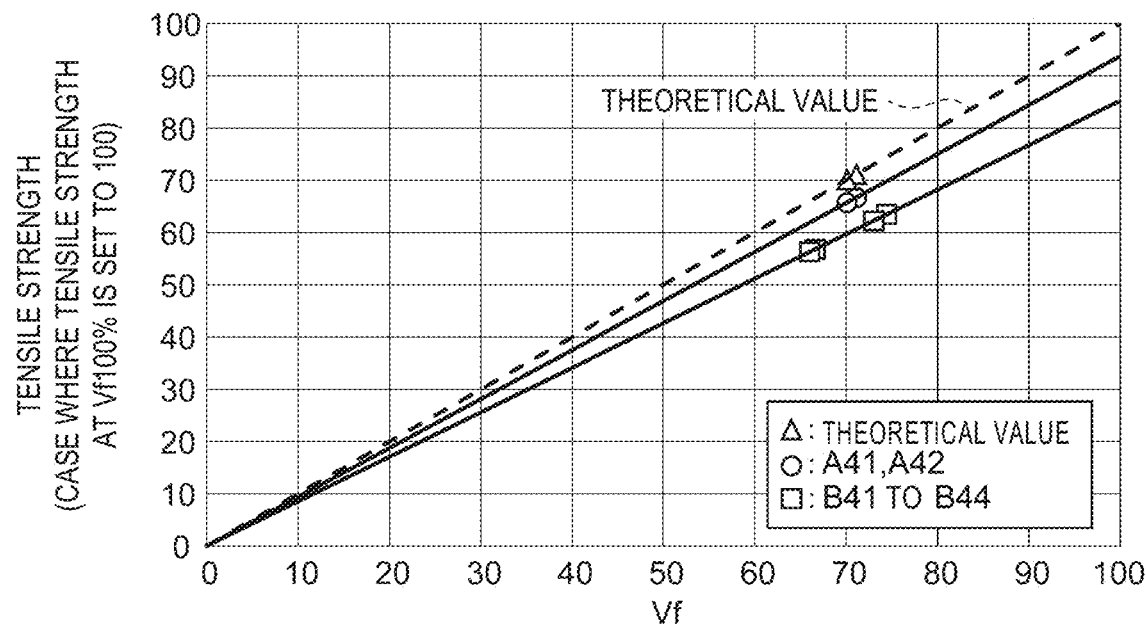
FIG. 21 is a graph showing NOL ring test results of Example 4.

In the ring-shaped test pieces A41 and A42, an inner diameter was set to 35 mm, an outer diameter was set to 40 mm, and a width was set to 3 mm. In the NOL ring test, a 5582 type universal material test machine (manufactured by Instron) was used, and the test was performed at a tensile speed of 2 mm/min. The test results are shown in FIG. 21. In FIG. 21, the horizontal axis represents a fiber volume content (Vf), and the vertical axis represents an index value representing relative tensile strength in a case where a theoretical strength when the fiber volume content is 100% is set to 100. In addition, the graph of FIG. 21 also shows a theoretical value of the tensile strength with respect to the same fiber volume content as in the ring-shaped test pieces A41 and A42.

As Comparative Example 4, ring-shaped test pieces B41 to B44 which are carbon fiber-reinforced molded articles in which carbon fibers (raw fiber) to which CNTs do not adhere are set as a reinforcement fiber were prepared, and the NOL ring test was performed. As the carbon fibers of the ring-shaped test pieces B41 to B44, the same carbon fibers as in the ring-shaped test pieces A41 and A42 were used, and the ring-shaped test pieces B41 to B44 were prepared under the same conditions as in the ring-shaped test pieces A41 and A42 except that carbon fibers were used as raw fiber. Test results of the ring-shaped test pieces B41 to B44 of Comparative Example 4 are shown in FIG. 21.

From the graph in FIG. 21, it can be seen that in the ring-shaped test pieces A41 and A42 in which the carbon fibers 11 to which the CNTs 17 adhere are set as the reinforcement fiber, the tensile strength is further improved in comparison to the ring-shaped test pieces B41 to B44 in which the carbon fibers (raw fiber) are set as the reinforcement fiber, and the tensile strength is close to a theoretical value.

Example 5

In Example 5, interface adhesion strength between the carbon fibers 11 and the matrix resin was evaluated by a fragmentation method. In addition, interface adhesion strength between the carbon fibers 11 and the matrix resin in accordance with a difference in the mass ratio Rm of the sizing agent was evaluated.

First, the concentration of the carbodiimide compound in the first sizing treatment solution was adjusted, and composite materials 10 in which the mass ratio Rm of the sizing agent are 0.6%, 0.8%, 1.0%, 1.1%, and 1.5% were prepared, respectively. With respect to each of the prepared composite materials 10, one CNT composite fiber is taken out from the carbon fiber bundle 12, and the CNT composite fiber was embedded in a soft epoxy resin, thereby preparing test pieces A51 to A55. With regard to the test pieces A51 to A55, three test pieces were prepared for each of a plurality of production lots of the composite material 10. TORAYCA T700SC (manufactured by TORAY INDUSTRIES, INC. was used as the carbon fibers 11. Note that, the other preparation conditions of the composite material 10 were set to be the same as in Example 1.

After applying a tensile load to each of the test pieces A51 to A55 until the carbon fibers 11 were not cut, a length of each cut piece of the carbon fibers 11 at a constant length was measured with respect to each test piece, an average (cut fiber length) of lengths of cut pieces for every production lot was obtained with respect to each of the test pieces A51 to A55. The measurement results are shown in a graph of FIG. 22.

Figure 22:
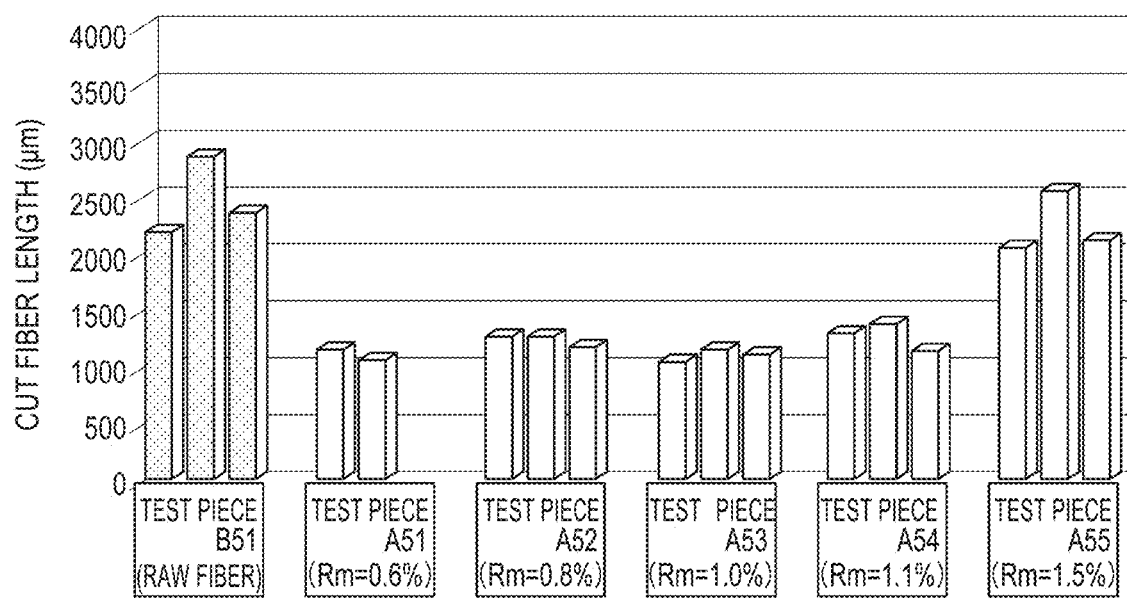
FIG. 22 is a graph showing a cut fiber length by a fragmentation method of Example 5.

As Comparative Example 5, a test piece B51 in which one carbon fiber (raw fiber) to which CNTs do not adhere was embedded in a soft epoxy resin was prepared. As in the test pieces A51 to A55, a tensile load was applied to the test piece B51, and an average of lengths (cut fiber lengths) of cut pieces for every production lot was obtained. The measurement results are shown in the graph of FIG. 22. Note that, preparation conditions of the test piece B51 were set to be the same as in the test pieces A51 to A55 except that the CNTs did not adhere to the carbon fiber.

It can be seen that the cut fiber length of the test pieces A51 to A55 becomes shorter than the cut fiber length of the test piece B51 in Comparative Example 5, and the interface adhesion strength between the CNT composite fibers and the matrix resin becomes higher than that of one using carbon fibers (raw fiber) to which CNTs did not adhere. In addition, it can be seen that the interface adhesion strength of the test pieces A51 to A54 in which the mass ratio Rm of the sizing agent is in a range of 0.6% to 1.1% is significantly higher in comparison to the test piece B51.

Figure 23:
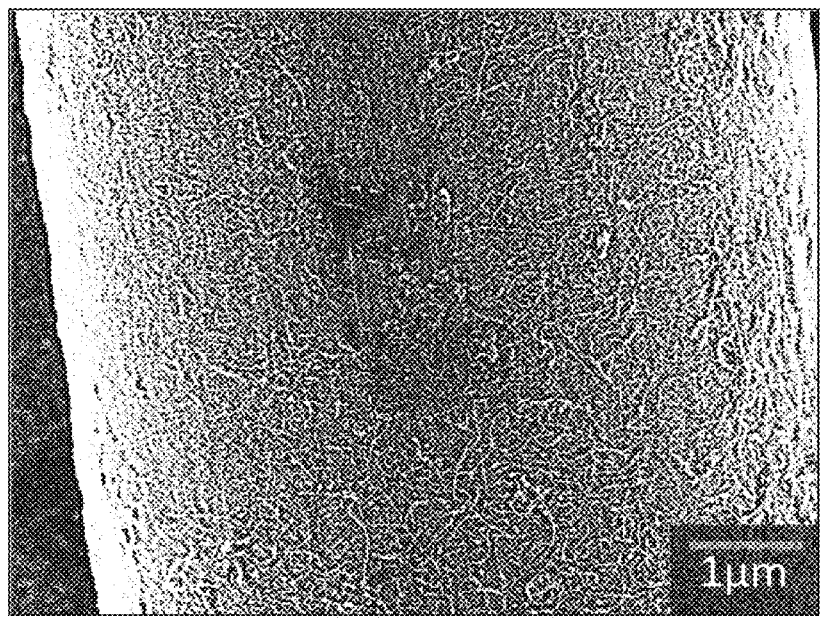
FIG. 23 is a SEM photograph showing an adhesion state of the first sizing agent to a structure in which a mass ratio Rm of the sizing agent is 0.8%.
Figure 24:
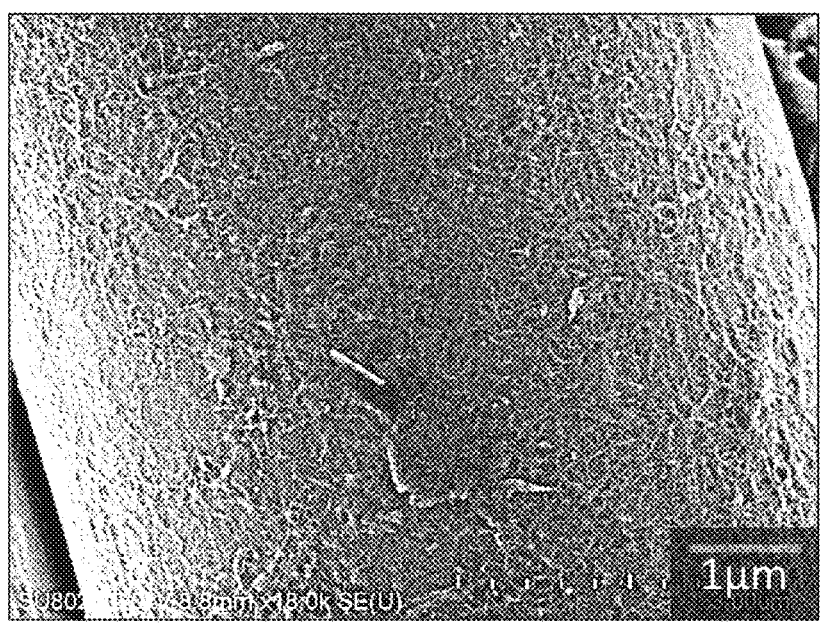
FIG. 24 is a SEM photograph showing an adhesion state of the first sizing agent to a structure in which a mass ratio Rm of the sizing agent is 1.1%.
Figure 25:
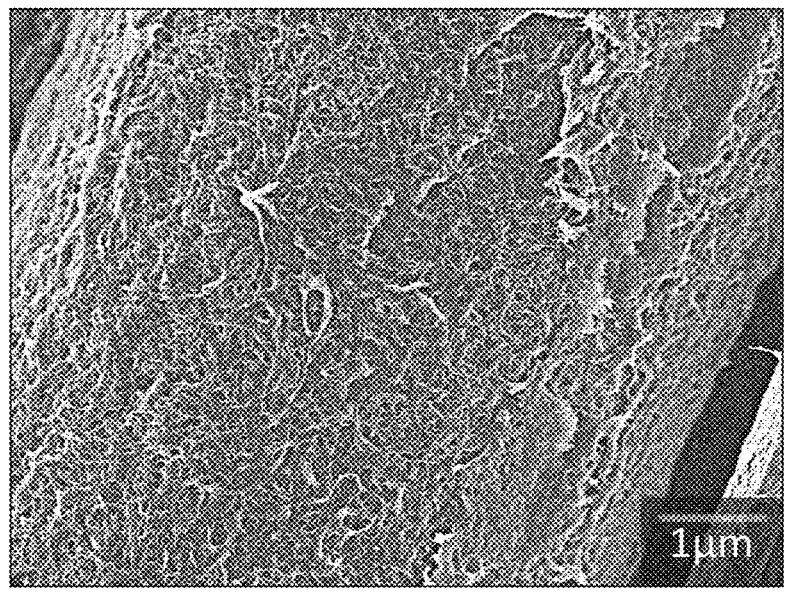
FIG. 25 is a SEM photograph showing an adhesion state of the first sizing agent to a structure in which a mass ratio Rm of the sizing agent is 1.5%.

Among the composite materials 10 prepared as described above, with respect to composite materials in which the mass ratio Rm of the sizing agent is 0.8%, 1.1%, or 1.5%, observation states of the first sizing agent 15 on the surface of the structure 14 with a field emission scanning electron microscope (FE-SEM) are shown in FIG. 23 to FIG. 25. It was confirmed that the gap 19 formed by the CNTs 17 was not filled up by the first sizing agent 15 in the structure 14 in which the mass ratio Rm of the sizing agent is 0.8% or 1.1%, but a large number of the gap 19 was filled up by the first sizing agent 15 in the structure 14 in which the mass ratio Rm of the sizing agent is 1.5%.

Example 6

In Example 6, the composite material 10 was set as a reinforcement fiber, and a plurality of ring-shaped test pieces A6 were prepared as rotary members 2 different in a fiber volume content (Vf) of carbon fibers, and tensile strength of each of the test pieces A6 was measured by an NOL ring test (conforming to ASTM D2290). In addition, as Comparative Example 6, a raw fiber (carbon fiber) was set as a reinforcement fiber, and a plurality of ring-shaped test pieces B6 different in the fiber volume content (Vf) of carbon fibers were prepared, and tensile strength of each of the test pieces B6 was measured in a similar manner. In the NOL ring test in Example 6 and Comparative Example 6, the 5582 type universal material test machine was used, and the test was performed at a tensile speed of 2 mm/min. Note that, the ring-shaped test pieces A6 and B6 were prepared in a similar manner as in Example 4. However, in any of the ring-shaped test pieces A6 and B6, TORAYCA T1100SC-12000 (manufactured by TORAY INDUSTRIES, INC.) was used as the carbon fibers 11.

Figure 26:
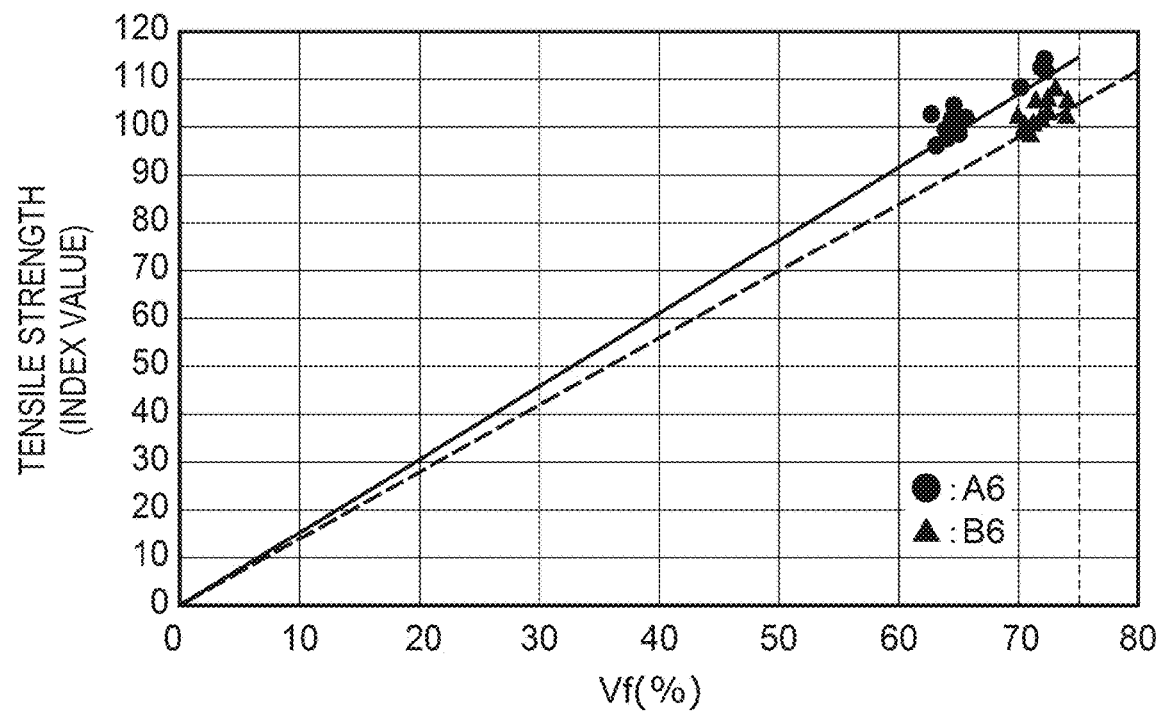
FIG. 26 is a graph showing NOL ring test results in Example 6 and Comparative Example 6.

The measurement results are shown in FIG. 26. In FIG. 26, ● represents a plot of respective measurement results in Example 6, and ▲ represents a plot of respective measurement results in Comparative Example 6. In addition, in FIG. 26, the horizontal axis represents a fiber volume content (Vf) of the carbon fibers in the ring-shaped test pieces, and the vertical axis represents tensile strength (index value). A solid line is an approximate straight line representing a relationship between the fiber volume content obtained by a least square method and the tensile strength (index value) on the basis of the measurement values in Example 6, and a broken line is an approximate straight line representing a relationship between the fiber volume content and the tensile strength (index value) which are obtained in a similar manner as in Example 6 on the basis of the measurement values in Comparative Example 6. The tensile strength (index value) is a value showing relative tensile strength in a case where tensile strength when the fiber volume content of the reinforcement fiber which is obtained from the relationship (approximate straight line) between the fiber volume content and the tensile strength (index value) in Comparative Example 6 is 70% is set as "100". In addition, in FIG. 27, a region where the fiber volume content is 60% or more and the tensile strength (index value) is 90 or more in FIG. 26 is shown in an enlarged manner.

Figure 27:
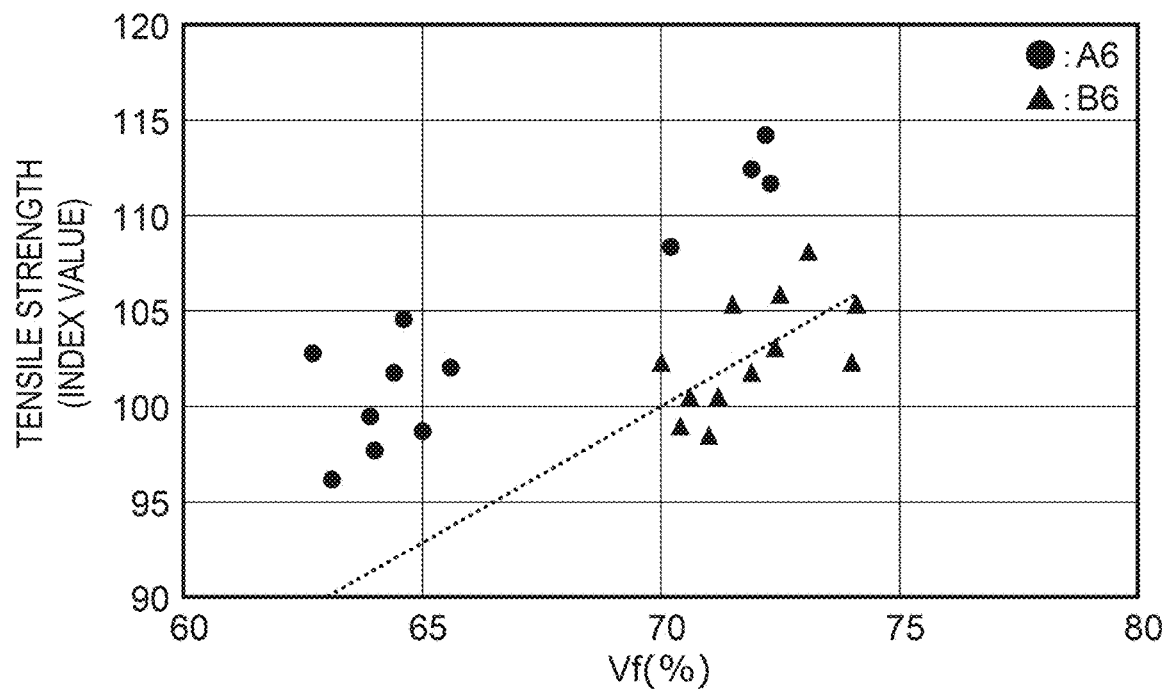
FIG. 27 is a graph showing a region in which a fiber volume content is 60% or more and tensile strength (index value) is 90 or more among the NOL ring test results in Example 6 and Comparative Example 6 in an enlarged manner.

From FIG. 26 and FIG. 27, it could be confirmed that the tensile strength is improved in proportion to the fiber volume content. The tensile strength (index value) of each ring-shaped test piece A6 is plotted on an upper side of the approximate straight line representing a relationship between the fiber volume content and the tensile strength (index value) of Comparative Example 6 even in a case where the fiber volume content is in a relatively low range of 60% or more and less than 70%, and even in a case where the fiber volume content is in a relatively high range of 70% or more (less than 75%). That is, it can be seen that the ring-shaped test piece A6 in which the CNT composite fiber is set as a reinforcement fiber has higher tensile strength in comparison to a ring-shaped test piece in which a raw fiber of carbon fibers having the same fiber volume content is set as a reinforcement fiber. Specifically, in the same fiber volume content, the tensile strength of the ring-shaped test piece in which the composite material 10 is set as a reinforcement fiber as in Example 6 is a value higher than the tensile strength of the ring-shaped test piece in which the raw fiber is set as a reinforcement fiber as in Comparative Example 6 by approximately 10%. In addition, in a case where the composite material 10 is set as a reinforcement fiber, the fiber volume content for obtaining the same tensile strength becomes a value smaller than the fiber volume content in a case where the yaw yarn is set as a reinforcement fiber by approximately 10%. From the approximate straight line, the tensile strength in a case where the fiber volume content of the ring-shaped test piece in which the composite material 10 is set as a reinforcement fiber is 74% corresponds to a value of tensile strength in a case where the fiber volume content of a ring-shaped test piece in which the raw fiber is set as a reinforcement fiber is 81%.

Typically, when the fiber volume content exceeds 80%, a carbon fiber-reinforced molded article becomes brittle due to a decrease in the amount of a matrix resin, and thus there is a limitation in an increase of the fiber volume content for improving the tensile strength. However, when using the composite material 10 as a reinforcement fiber of the rotary member 2, even in a relatively smaller fiber volume content, higher tensile strength is obtained in comparison to a case of using a raw fiber as a reinforcement fiber. Accordingly, high tensile strength and high brittleness resistance are compatible.

Example 7

As Example 7, a fracture state was evaluated with respect to a plurality of ring-shaped test pieces different in the fiber volume content (Vf). The plurality of evaluated ring-shaped test pieces include the ring-shaped test piece A6 for which the tensile strength has been measured in Example 6 as described above. The evaluation for the fracture state was performed as follows. First, a plurality of the ring-shaped test pieces A6 which are evaluation targets were classified into a first group in which the fiber volume content is 60% or more and less than 70%, and a second group in which the fiber volume content is 70% or more. Then, each of the ring-shaped test pieces was pulled at a tensile speed of 2 mm/min by using a 5582 type universal material test machine, and a fracture state of the ring-shaped test piece was investigated. It could be seen that the fracture state of the ring-shaped test piece can be roughly classified into two types including a fault fracture mode and an interlayer fracture mode. Classification into the fault fracture mode and the interlayer fracture mode was performed for every group. A ratio of the number of pieces classified into each fracture mode in each group was obtained as a percentage. The obtained ratio is shown in Table 1 as an evaluation result. In addition, as Comparative Example 7, with respect to a plurality of ring-shaped test pieces different in the fiber volume content (Vf) of carbon fibers in which the raw fiber is set as a reinforcement fiber, a fracture state was evaluated in a similar manner as in Example 7. The plurality of evaluated ring-shaped test pieces include each ring-shaped test piece B6 for which the tensile strength was measured in Comparative Example 6 as described above. The evaluation results are shown in Table 2.

Figure 28:
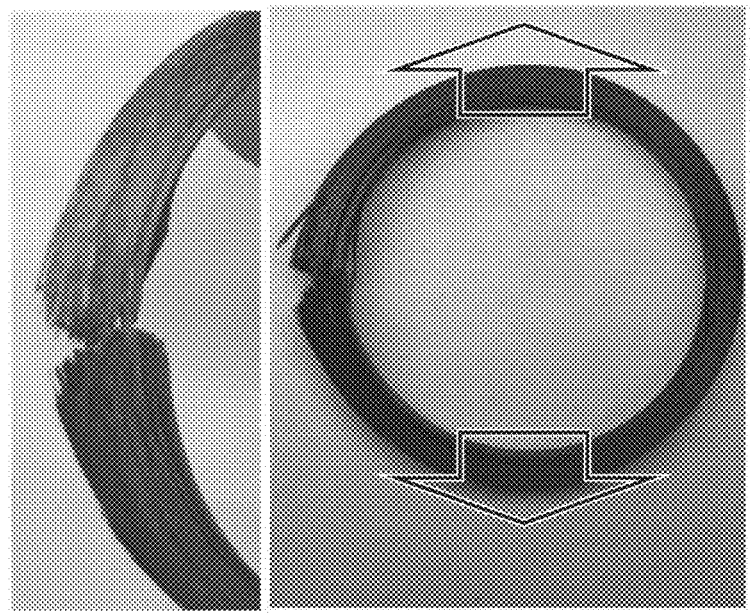
FIG. 28 is a photograph showing a ring test piece that is fractured in a fault fracture mode.
Figure 29:
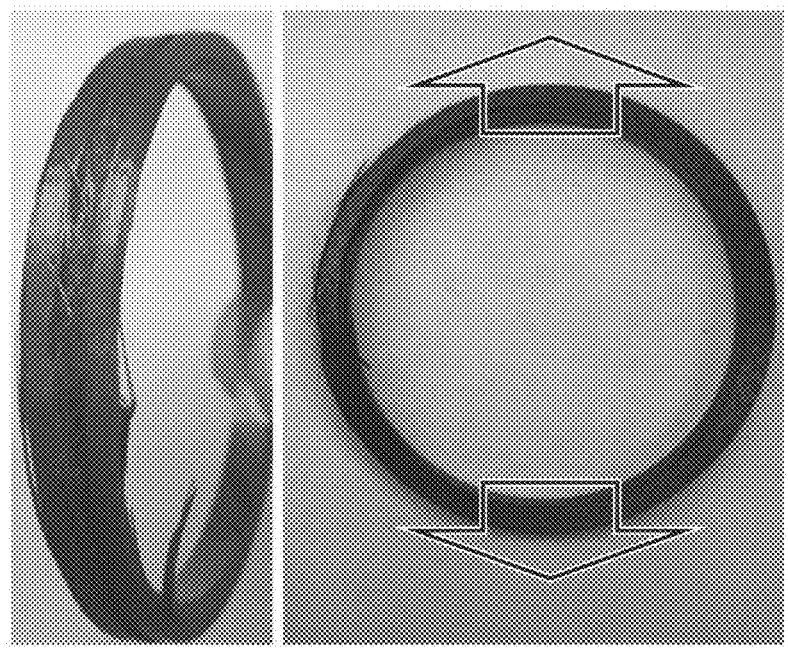
FIG. 29 is a photograph showing a ring test piece that is fractured in an interlayer fracture mode.

As shown in FIG. 28, the fault fracture mode is a fracture aspect in which each of a plurality of carbon fibers constituting the ring-shaped test piece is cut out. In the fault fracture mode, from a result of analysis of an X-ray CT image, it was confirmed that cracks occur diagonally across each fiber layer and the cracks lead to fracture, and no peeling occurs in all or most of the fiber layers after the fracture. On the other hand, as illustrated in FIG. 29, the interlayer fracture mode is a fracture aspect in which cracks occur in a circumferential direction and the shape is collapsed. In the interlayer fracture mode, from a result of analysis of an X-ray CT image, traces in which peeling occurs between fiber layers of the ring-shaped test piece and the peeling leads to fracture were confirmed by the X-ray CT image. It was confirmed that peeling between the fiber layers after fracture occurs in almost all layers.

TABLE 1

| Example 7 | | |
|---|---|---|
| | 60% ≤ Vf < 70 | 70% ≤ Vf |
| Fault fracture mode | 79% | 100% |
| Interlayer fracture mode | 21% | 0% |

TABLE 2

| Comparative Example 7 | | |
|---|---|---|
| | 60% ≤ Vf < 70 | 70% ≤ Vf |
| Fault fracture mode | 0% | 100% |
| Interlayer fracture mode | 100% | 0% |

In Comparative Example 7, in the second group in which the tensile strength is relatively high (70%≤Vf), all test pieces were the fault fracture mode, and in the first group in which the tensile strength is relatively low (60%≤Vf<70%), all test pieces were the interlayer fracture mode. In contrast, in Example 7, in the second group, all test pieces were the fault fracture mode as in Comparative Example 7, but in the first group, test pieces corresponding to 21% were the interlayer fracture mode, and test pieces corresponding to 79% were the fault fracture mode. The reason for this is considered as follows. In Example 7, even in a case where the fiber volume content is 60% or more and less than 70%, peeling between the fiber layers is less likely to occur due to an improvement in actual interface adhesion strength between the matrix resin M and the carbon fibers 11 through formation of the composite region 18, and the interlayer fracture mode is further reduced in comparison to Comparative Example 7.

Example 8

Figure 30:
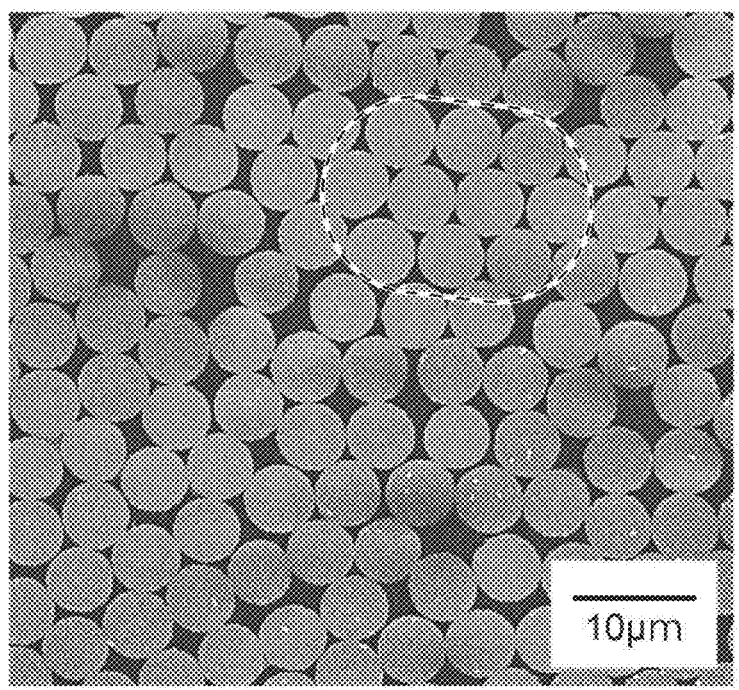
FIG. 30 is a SEM photograph showing a cross-section of an observation sample taken out from a ring test piece in Example 8.
Figure 31:
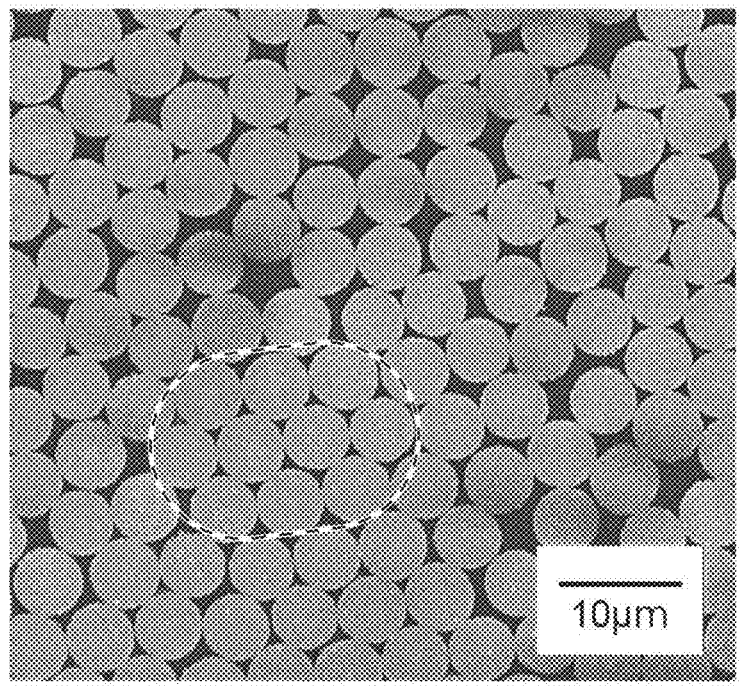
FIG. 31 is a SEM photograph showing a cross-section of an observation sample taken out from a ring test piece in Comparative Example 8.
Figure 32:
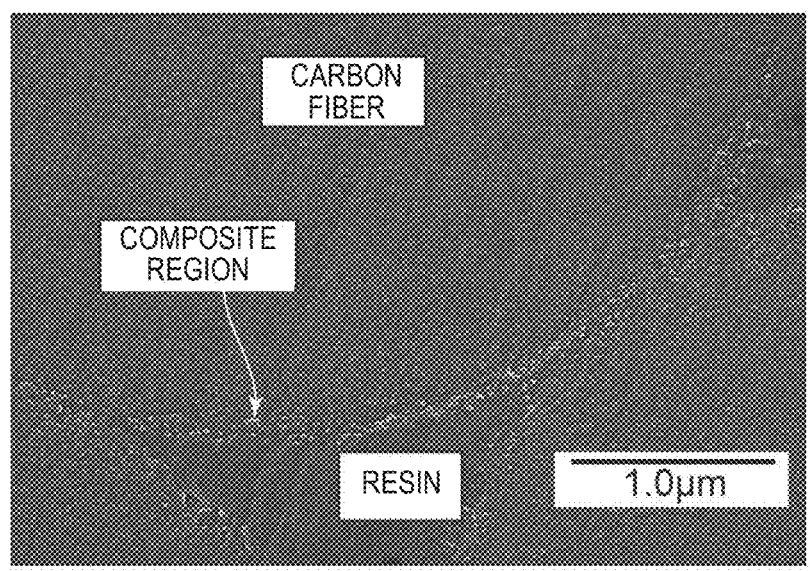
FIG. 32 is an FE-SEM photograph showing the cross-section of the observation sample taken out from the ring test piece in Example 8 in a further enlarged manner.
Figure 33:
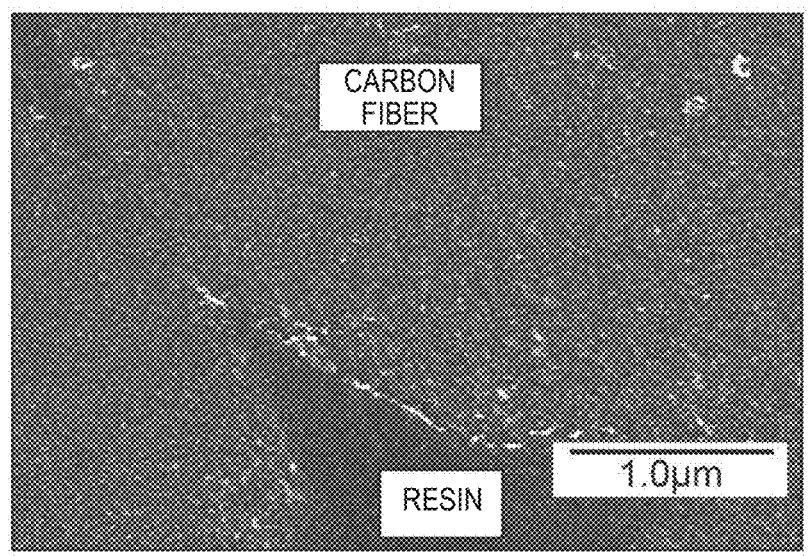
FIG. 33 is an FE-SEM photograph showing the cross-section of the observation sample taken out from the ring test piece in Comparative Example 8 in a further enlarged manner.

In Example 8, a part of the ring-shaped test piece A6 fractured in the tensile test of Example 6 was cut and was set as an observation sample for observing a cut-out surface. The cut-out surface of the observation sample was polished and observed with a scanning electron microscope (SEM) and a field-emission scanning electron microscope (FE-SEM), respectively. In addition, in Comparative Example 8, a part of the ring-shaped test piece B6 fractured in the tensile test of Comparative Example 6 was cut out and was set as an observation sample, and observation was performed in a similar manner as in Example 8. FIG. 30 is a SEM photograph of Example 8, FIG. 31 is a SEM photograph of Comparative Example 8, FIG. 32 is an FE-SEM photograph of Example 8, and FIG. 33 is an FE-SEM photograph of Comparative Example 8. Note that, the ring-shaped test piece A6 from which the observation sample was cut out had a fiber volume content of 72.2%, and the ring-shaped test piece B6 from which the observation sample was cut out had a fiber volume content of 72.5%.

In the ring-shaped test pieces A6 and B6, as in regions surrounded by a broken line in FIG. 30 and FIG. 31, closest packing sites where the carbon fibers are very densely packed were observed in any of the ring-shaped test pieces A6 and B6, and a clear difference was not observed between Example 8 and Comparative Example 8. In a case where the fiber volume content is approximately 72%, the closest packing sites are confirmed. From this, it is considered that when further increasing the fiber volume content, a region having a brittleness problem due to a decrease in the amount of the matrix resin absorbing deformation occurs. Accordingly, there is a limitation in an improvement of the tensile strength through an increase in the fiber volume content.

In the ring-shaped test piece A6, as shown in FIG. 32, it was observed that the composite region 18 having a thickness of approximately 0.1 pm exists at an interface between the carbon fibers 11 and the matrix resin M to cover surfaces of the carbon fibers 11 at a uniform thickness, the matrix resin M enters a gap in the structure 14 having a three-dimensional network shape in which the plurality of CNTs 17 are entangled with each other in a non-woven fabric shape, the matrix resin M forms a three-dimensional network shape and enters each other as a network structure, and the CNTs 17 and the matrix resin M form a mutual network structure at a nano level. At the closest packing site, in a region where adjacent carbon fibers 11 are close to each other, it was confirmed that the composite region 18 is compressed and the thickness becomes 0.01 pm or less. It can be seen that a plurality of the composite regions 18 on the adjacent carbon fibers 11 are fixed to each other and are integrated with each other, and form a cross-linked structure in which the carbon fibers 11 are cross-linked.

On the other hand, as shown in FIG. 33, in the ring-shaped test piece B6, a clear boundary line was observed at an interface between the carbon fibers and the matrix resin. At the closest packing site, adjacent carbon fibers are in contact with each other, or a very thin matrix resin is interposed between the adjacent carbon fibers. Accordingly, bonding strength of two adjacent carbon fibers does not exceed adhesion strength at the interface between the carbon fibers and the matrix resin.

In the ring-shaped test piece A6, two adjacent carbon fibers 11 more strongly adhere to each other due to the cross-linked structure in comparison to the ring-shaped test piece B6. According to this, even in a case where a large tensile force is applied to the ring-shaped test piece A6 toward an outward side in a diameter direction, it can be seen that bonding between the adjacent carbon fibers 11 due to the cross-linked structure is not easily fractured, and higher tensile strength is exhibited due to the plurality of integrated carbon fibers 11 in comparison to the ring-shaped test piece B6.

REFERENCE SIGN LIST

2: Rotary member
3: Surface magnet type electric motor
4: Rotor
10: Composite material
11: Carbon fiber
14: Structure
15: First sizing agent
17: Carbon nanotube
37: Second sizing agent
M: Matrix resin

The invention claimed is:

1. A rotary member including an inner circumference and an outer circumference rotatable along a circumferential direction of the inner circumference and the outer circumference, the rotary member comprising:
    carbon fibers wound in the circumferential direction;
    a matrix resin in which the carbon fibers are embedded;
    a structure which includes a plurality of carbon nanotubes having a bent shape with a bent portion, forms a network structure including a contact portion where the carbon nanotubes are in direct contact with each other, and is provided on surfaces of the carbon fibers; and
    a first sizing agent which functions as an aqueous cross-linking agent, the first sizing agent cross-links and fixes the carbon nanotubes which are in direct contact with each other around the contact portion,
    wherein, in the structure, a gap surrounded by the plurality of carbon nanotubes is formed, and the first sizing agent does not fill up the gap.

2. The rotary member according to claim 1,
    wherein the structure has a thickness in a range of 50 nm to 200 nm.

3. The rotary member according to claim 1,
    wherein a fiber volume content of the carbon fibers is less than 75%.

4. The rotary member according to claim 1,
    wherein a first sizing agent includes a carbodiimide-derived structure.

5. A method for manufacturing a rotary member including an inner circumference and an outer circumference rotatable along a circumferential direction of the inner circumference and the outer circumference, comprising:
    a structure forming process of immersing carbon fibers in a dispersion in which carbon nanotubes having a bent shape with a bent portion are dispersed and to which ultrasonic vibration is applied to adhere the carbon nanotubes to the carbon fibers, thereby forming a structure having a network structure including a contact portion where the carbon nanotubes are in direct contact with each other on surfaces of the carbon fibers;
    a first sizing treatment process of causing the carbon fibers to come into contact with a first sizing treatment solution, after the structure forming process, to apply a first sizing agent which functions as an aqueous cross-linking agent, the first sizing agent cross-links and fixes the carbon nanotubes which are in direct contact with each other; and
    a molding process of applying a matrix resin to the carbon fibers in which the structure is formed, winding the carbon fibers applied with the matrix resin around a mandrel, curing the matrix resin, and pulling out the mandrel, after the first sizing treatment process,
    wherein, in the structure, a gap surrounded by the plurality of carbon nanotubes is formed, and the first sizing agent does not fill up the gap.

6. The method for manufacturing a rotary member according to claim 5,
    wherein the first sizing treatment solution is a solution in which a carbodiimide compound having a carbodiimide group is dissolved.

7. The method for manufacturing a rotary member according to claim 6,
    wherein in the first sizing treatment process, the first sizing agent is applied in a mass within a range of 0.6% to 1.1% with respect to a mass of the carbon fibers.

8. The method for manufacturing a rotary member according to claim 6,
    wherein in the structure forming process, the structure is formed in a thickness within a range of 50 nm to 200 nm.

9. The method for manufacturing a rotary member according to claim 5,
    wherein in the molding process, the carbon fibers applied with the matrix resin is wound around the mandrel so that a fiber volume content of the carbon fibers in the rotary member is less than 75%.

* * * * *